United States Patent
Fujii et al.

(10) Patent No.: US 11,097,420 B2
(45) Date of Patent: Aug. 24, 2021

(54) INTERFERENCE DETERMINATION APPARATUS FOR ARTICULATED ROBOT, INTERFERENCE DETERMINATION METHOD FOR ARTICULATED ROBOT, INTERFERENCE DETERMINATION PROGRAM FOR ARTICULATED ROBOT, AND PATH PLANNING APPARATUS

(71) Applicant: OMRON Corporation, Kyoto (JP)

(72) Inventors: Haruka Fujii, Kyoto (JP); Toshihiro Moriya, Kyoto (JP); Takeshi Kojima, Kyoto (JP); Norikazu Tonogai, Kyoto (JP)

(73) Assignee: OMRON Corporation, Kyoto (JP)

( * ) Notice: Subject to any disclaimer, the term of this patent is extended or adjusted under 35 U.S.C. 154(b) by 330 days.

(21) Appl. No.: 16/387,594

(22) Filed: Apr. 18, 2019

(65) Prior Publication Data

US 2019/0351550 A1    Nov. 21, 2019

(30) Foreign Application Priority Data

May 15, 2018 (JP) .............................. JP2018-093928

(51) Int. Cl.
  *B25J 9/16*  (2006.01)
  *B25J 9/06*  (2006.01)
  *B25J 9/04*  (2006.01)

(52) U.S. Cl.
  CPC ............... *B25J 9/1666* (2013.01); *B25J 9/04* (2013.01); *B25J 9/06* (2013.01)

(58) Field of Classification Search
  CPC ...................................... B25J 9/16; B25J 9/06
  See application file for complete search history.

(56) References Cited

U.S. PATENT DOCUMENTS

| 2009/0019410 A1* | 1/2009 | Yoshizawa ............. B25J 9/1664 716/119 |
| 2014/0012420 A1* | 1/2014 | Yasue .................... G05B 19/18 700/264 |

(Continued)

FOREIGN PATENT DOCUMENTS

| DE | 102007059480 A1 | 6/2009 |
| DE | 102008013400 A1 | 9/2009 |

(Continued)

OTHER PUBLICATIONS

The extended European search report dated Oct. 28, 2019 in a counterpart European patent application.

*Primary Examiner* — Kira Nguyen
(74) *Attorney, Agent, or Firm* — Metrolex IP Law Group, PLLC

(57) ABSTRACT

An interference determination apparatus includes: an acquisition unit that acquires region information indicating regions set in a configuration space in which the angles of rotation of two or three specific joints of an articulated robot are indicated by coordinate axes, the regions including an interference region in which the robot is determined to interfere with itself or an obstacle based on the magnitudes of the angles of rotation of the specific joints, and a non-interference region in which the robot is determined to not interfere with itself or an obstacle based on the magnitudes of the angles of rotation of specific joints; and a determination unit that determines whether the robot interferes with itself or an obstacle, by determining whether coordinates indicating a posture determined by the angles of rotation of the specific joints belong to the interference region or the non-interference region indicated by the acquired region information.

18 Claims, 19 Drawing Sheets

(56) References Cited

U.S. PATENT DOCUMENTS

| 2014/0018959 A1* | 1/2014 | Matsui | B25J 9/1612 |
| | | | 700/255 |
| 2016/0008977 A1* | 1/2016 | Nishio | B25J 9/1664 |
| | | | 700/262 |

FOREIGN PATENT DOCUMENTS

| JP | 2008-030136 A | 2/2008 |
| JP | 2011-131303 A | 7/2011 |

* cited by examiner

INTERFERENCE DETERMINATION APPARATUS FOR ARTICULATED ROBOT, INTERFERENCE DETERMINATION METHOD FOR ARTICULATED ROBOT, INTERFERENCE DETERMINATION PROGRAM FOR ARTICULATED ROBOT, AND PATH PLANNING APPARATUS

CROSS-REFERENCES TO RELATED APPLICATIONS

This application claims priority to Japanese Patent Application No. 2018-093928 filed May 15, 2018, the entire contents of which are incorporated herein by reference.

FIELD

The disclosure relates to an interference determination apparatus for an articulated robot, an interference determination method for an articulated robot, an interference determination program for an articulated robot, and a path planning apparatus.

BACKGROUND

Conventionally, techniques for path planning in consideration of self-interference of a robot have been proposed (see JP-A-2011-131303 and JP-A-2008-30136, for example).

Conventionally, when determining self-interference of a robot, determination has been performed exhaustively regarding each of the combinations of a plurality of links that constitute the robot. For example, when the number of links is n, the number of combinations of the links for which determination regarding self-interference needs to be performed is $_nC_2-(n-1)$, although it depends on the shapes of the links and the like.

JP-A-2011-131303 and JP-A-2008-30136 are examples of background art.

For example, in a case of an articulated robot with six degrees of freedom having six joints, if an end effector (EE) is included, then the number of links is at least eight as shown in FIG. 24, and the number of combinations of links for which determination regarding self-interference needs to be performed is at least 21. In addition, if the number of links increases, the number of combinations of the links for which a determination regarding self-interference needs to be performed increases largely. Accordingly, the time required for the determination regarding self-interference increases, and the time required for path planning of the robot also increases. In addition, the end user has had a problem that a time before the robot starts operating increases, and the takt time also increases.

One or more embodiments have been made in light of the above-described issues, and aims to provide an interference determination apparatus for an articulated robot, an interference determination method for an articulated robot, and an interference determination program for an articulated robot, which make it possible to shorten a time required for determination regarding interference of the articulated robot, as well as a path planning apparatus.

SUMMARY

An interference determination apparatus for an articulated robot according to one or more embodiments includes an acquisition unit that acquires region information indicating regions that are set in a configuration space in which angles of rotation of two or three specific joints of the articulated robot are indicated by coordinate axes, the regions including an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints, and a determination unit that determines whether or not the articulated robot interferes with itself or the obstacle by determining whether coordinates indicating a posture that is determined by the angles of rotation of the specific joints belong to the interference region or the non-interference region that are indicated by the region information acquired by the acquisition unit.

In addition, the region information may include information indicating a detail determination region as a region that does not belong to the interference region or the non-interference region.

In addition, if the interference is self-interference (the articulated robot interferes with itself), and the coordinates belong to the detail determination region, the determination unit may determine whether or not the self-interference occurs, based on shapes of a plurality of links that constitute the articulated robot.

In addition, a calculation unit that calculates the region information based on the shapes of the plurality of links that constitute the articulated robot and movable ranges of a plurality of joints that connect the plurality of links may be included.

In addition, the calculation unit may simplify a shape of the interference region so as to fit within an outline of the interference region.

In addition, the calculation unit may simplify the shape of the interference region so as to fit within an outline of the non-interference region.

In addition, the calculation unit may calculate first region information indicating the interference region and the non-interference region that are set in a configuration space in which angles of rotation of two or three specific joints on a base side of the articulated robot are indicated by coordinate axes and second region information indicating the interference region and the non-interference region that are set in a configuration space in which angles of rotation of two or three specific joints on a tip end side of the articulated robot are indicated by coordinate axes, the acquisition unit may acquire the first region information and the second region information calculated by the calculation unit, and the determination unit may determine whether or not the articulated robot interferes with itself or an obstacle, by determining whether coordinates indicating a posture that is determined by the angles of rotation of the two or three specific joints on the base side belong to the interference region or the non-interference region that are indicated by the first region information acquired by the acquisition unit, or may determine whether or not the articulated robot interferes with itself or an obstacle, by determining whether coordinates indicating a posture that is determined by the angles of rotation of the two or three specific joints on the tip end side belong to the interference region or the non-interference region that are indicated by the second region information acquired by the acquisition unit.

In addition, when calculating information that indicates the non-interference region in the first region information, the calculation unit may calculate a maximum movable range based on a shape of a link on the tip end side and a movable range of an joint on the tip end side, and calculate information indicating the non-interference region based on the calculated maximum movable range and shapes of a plurality of links on the base side.

In addition, the interference is obstacle interference (the articulated robot interferes with an obstacle), and the calculation unit may calculate region information indicating an obstacle interference region in which the articulated robot interferes with the obstacle and a non-obstacle-interference region in which the articulated robot does not interfere with the obstacle.

In an interference determination method for an articulated robot according to one or more embodiments, a computer executes a step of acquiring region information indicating regions that are set in a configuration space in which angles of rotation of two or three specific joints of the articulated robot are indicated by coordinate axes, the regions including an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints, and a step of determining whether or not the articulated robot interferes with itself or the obstacle by determining whether coordinates indicating a posture that is determined by the angles of rotation of the specific joints belong to the interference region or the non-interference region that are indicated by the region information acquired in the step of acquiring.

An interference determination program for an articulated robot according one or more embodiments causes a computer to function as an acquisition unit that acquires region information indicating regions that are set in a configuration space in which angles of rotation of two or three specific joints of the articulated robot are indicated by coordinate axes, the regions including an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints, and a determination unit that determines whether or not the articulated robot interferes with itself or the obstacle by determining whether coordinates indicating a posture that is determined by the angles of rotation of the specific joints belong to the interference region or the non-interference region that are indicated by the region information acquired by the acquisition unit.

A path planning apparatus according to one or more embodiments includes a path search apparatus that performs path planning by searching for postures in which an articulated robot does not interfere itself or an obstacle when the articulated robot is operated from an initial posture to a target posture, and the above-described interference determination apparatus that determines whether or not the articulated robot in a posture retrieved by the path search apparatus interferes with itself or an obstacle.

According to one or more embodiments, it is possible to shorten a time required for determination regarding interference of an articulated robot.

DETAILED DESCRIPTION

Figure 1:
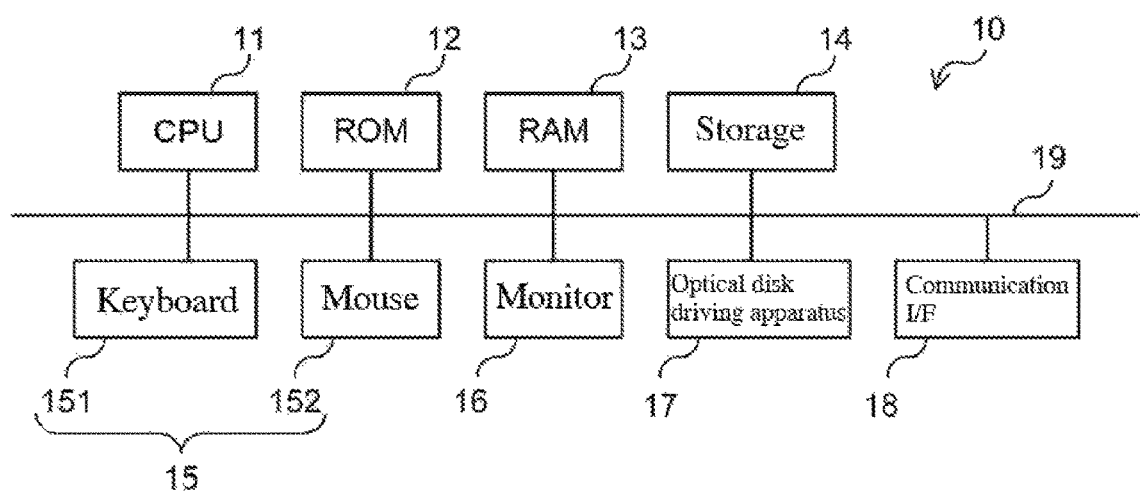
FIG. 1 is a block diagram illustrating a hardware configuration of an interference determination apparatus according to a first embodiment.

Exemplary embodiments will be described below with reference to the drawings. Note that, in the drawings, the same reference numerals are assigned to the same or equivalent constituent elements and parts. In addition, dimension ratios in the drawings may be exaggerated for convenience of explanation, and may be different from the actual ratios.

First Embodiment

FIG. 1 is a block diagram showing the hardware configuration of an interference determination apparatus (hereinafter, simply referred to as "interference determination apparatus") 10 for an articulated robot according to a first embodiment.

The interference determination apparatus 10 of one or more embodiments performs determination regarding self-interference of a target articulated robot. Examples of articulated robots include vertically articulated robots, horizontally articulated robots (SCARA robots), parallel link robots, and the like. In one or more embodiments, a case of performing determination regarding self-interference of a vertically articulated robot will be described as an example.

As shown in FIG. 1, the interference determination apparatus 10 includes a CPU (central processing unit) 11, a ROM (read only memory) 12, a RAM (random access memory) 13, a storage 14, an input unit 15, a monitor 16, an optical disk driving apparatus 17, and a communication interface 18. The constituent elements are communicatively connected to each other via a bus 19.

In one or more embodiments, the ROM 12 or the storage 14 stores a self-interference determination program for executing self-interference determination. The CPU 11 stands for central processing unit, and executes various programs and controls constituent elements. Specifically, the CPU 11 reads out a program from the ROM 12 or the storage 14, and executes the program using the RAM 13 as a work region. The CPU 11 performs processing for controlling the above constituent elements and processing for various types of calculation in accordance with programs recorded in the ROM 12 or the storage 14.

The ROM 12 stores various programs and various types of data. The RAM 13 temporarily stores programs or data, as a work region. The storage 14 is constituted by an HDD (hard disk drive) or an SSD (solid state drive), and stores various programs, including an operating system, and various types of data.

The input unit 15 includes a keyboard 151 and a pointing device, such as a mouse 152, and is used for performing various types of input. The monitor 16 is a liquid crystal display, for example, and displays various types of information. The monitor 16 may function as the input unit 15 by adopting a touch panel system. The optical disk driving apparatus 17 reads out data stored in any of various recording media (a CD-ROM, a Blue-ray disk, etc.), writes data to a recording medium, and the like.

The communication interface 18 is an interface for communicating with another apparatus, and, for example, a standard of Ethernet (registered trademark), an FDDI, Wi-Fi (registered trademark), or the like is used.

Next, the vertically articulated robot will be described.

Figure 2:
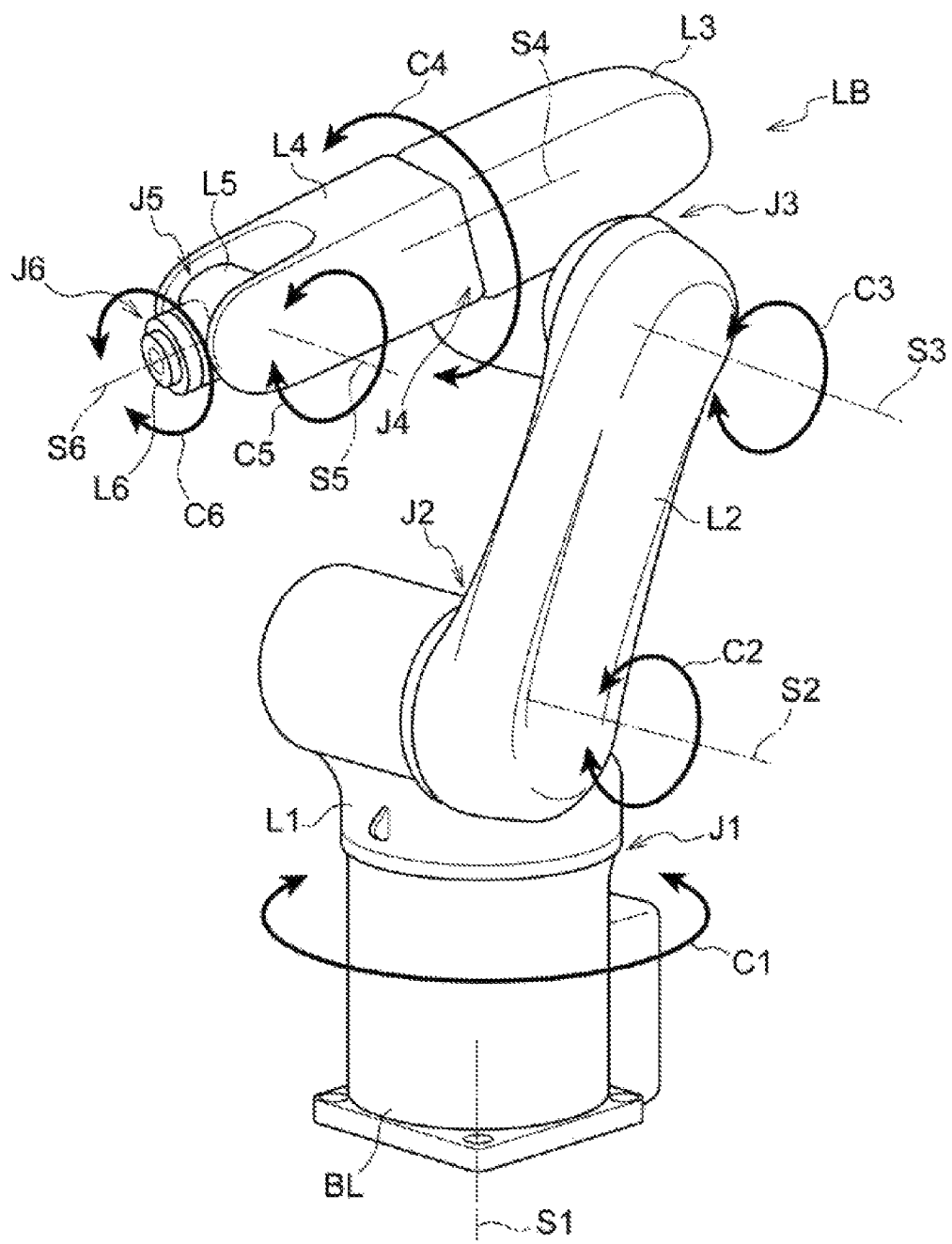
FIG. 2 is a perspective view illustrating an example of a vertically articulated robot.

FIG. 2 is a diagram showing the configuration of a vertically articulated robot LB. As shown in FIG. 2, the vertically articulated robot LB is a six-axis robot having six degrees of freedom provided with a base link BL, links L1 to L6, and joints J1 to J6. Note that the joints are joints that connect links.

The base link BL and the link L1 are connected with each other via the joint J1 that rotates about a vertical axis S1 in the direction of an arrow C1 in FIG. 2. Therefore, the link L1 rotates in the direction of the arrow C1 with the base link BL serving as a fulcrum.

In FIG. 2, the link L1 and the link L2 are connected with each other via the joint J2 that rotates about a horizontal axis S2 in the direction of an arrow C2. Therefore, the link L2 rotates in the direction of the arrow C2 with the link L1 serving as a fulcrum.

In FIG. 2, the link L2 and the link L3 are connected with each other via the joint J3 that rotates about an axis S3 in the direction of an arrow C3. Therefore, the link L3 rotates in the direction of the arrow C3 with the link L2 serving as a fulcrum.

In FIG. 2, the link L3 and the link L4 are connected with each other via the joint J4 that rotates about an axis S4 in the direction of an arrow C4. Therefore, the link L4 rotates in the direction of the arrow C4 with the link L3 serving as a fulcrum.

In FIG. 2, the link L4 and the link L5 are connected with each other via the joint J5 that rotates about an axis S5 in the direction of an arrow C5. Therefore, the link L5 rotates in the direction of the arrow C5 with the link L4 serving as a fulcrum.

In FIG. 2, the link L5 and the link L6 are connected with each other via the joint J6 that rotates about an axis S6 in the direction of an arrow C6. Therefore, the link L6 rotates in the direction of the arrow C6 with the link L5 serving as a fulcrum.

The ranges of predetermined angles of rotation of the joints J1 to J6 are set as movable ranges.

The posture of the articulated robot LB is determined by the angles of rotation of the joints J1 to J6. Specifically, when parameters that indicate the degrees of freedom of the links of the vertically articulated robot LB are defined as angles of rotation $\theta_1$ to $\theta_6$ of the joints J1 to J6, and the angles of rotation $\theta_1$ to $\theta_6$ are defined as values of coordinate axes, the posture of the vertically articulated robot LB can be expressed as coordinates, or in other words, as points in a configuration space. Here, the configuration space is a space that represents a coordinate system in which at least two from among the angles of rotation $\theta_1$ to $\theta_6$ are indicated by coordinate axes.

Next, the functional configuration of the interference determination apparatus 10 will be described.

Figure 3:
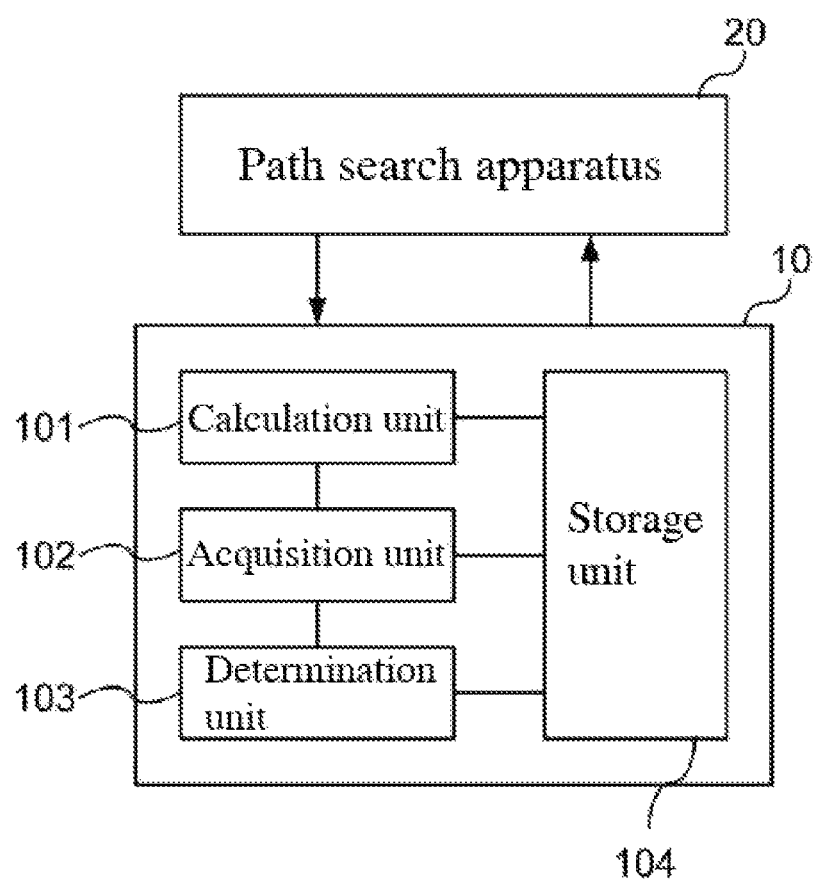
FIG. 3 is a block diagram illustrating an exemplary functional configuration of an interference determination apparatus.

FIG. 3 is a block diagram showing an exemplary functional configuration of the interference determination apparatus 10.

As shown in FIG. 3, the interference determination apparatus 10 has a calculation unit 101, an acquisition unit 102, a determination unit 103, and a storage unit 104 as functional constituent elements. The functional constituent elements are realized by the CPU 11 reading out a self-interference determination program stored in the ROM 12 or the storage 14, loading the program to the RAM 13, and executing the program.

The calculation unit 101 calculates region information based on the shapes of the links L1 to L6 that constitute the vertically articulated robot LB and the movable ranges of the joints J1 to J6 that connect the links L1 to L6.

The region information is information indicating regions that are set in a configuration space in which the angles of rotation of two or three specific joints of the vertically articulated robot LB are indicated (represented) by coordinate axes, and the regions include an interference region in which the vertically articulated robot LB interferes with itself, and that is determined based on the magnitudes of the angles of rotation of the specific joints and a non-interference region in which the vertically articulated robot LB does not interfere with itself, and that is determined based on the magnitudes of the angles of rotation of the specific joints.

Here, the self-interference region is defined as a region in which the vertically articulated robot LB necessarily interferes with itself, and interferes with itself regardless of the angles of rotation of the joints other than the specific joints. In addition, "interference" refers to links coming into physical contact with each other, or a link and an end effector coming into physical contact with each other.

In addition, a non-self-interference region is defined as a region in which the vertically articulated robot LB does not interfere with itself on any account, and does not interfere with itself on any account regardless of the angles of rotation of the joints other than the specific joints. In addition, the region information includes information indicating a detail determination region as a region that does not belong to the self-interference region or the non-self-interference region. Here, the detail determination region is a region in which it is required to determine specifically whether or not self-interference occurs, based on the shapes of the links arranged in the actual three-dimensional space.

Note that, in one or more embodiments, a case will be described in which the self-interference region is a region in which the vertically articulated robot LB necessarily interferes with itself, but the self-interference region does not need to be a region in which the vertically articulated robot LB necessarily interferes with itself. For example, a region where a predetermined threshold value or more, for example, where in 90% or more of that region the vertically articulated robot LB interferes with itself may be defined as a self-interference region. On the other hand, the non-self-interference region needs to be a region in which the vertically articulated robot LB does not interfere itself on any account. This is because, in actuality, there is a risk that, if a posture in which self-interference occurs is included in the non-self-interference region, even if it is determined that self-interference does not occur, self-interference may actually occur. Therefore, the non-self-interference region needs to be a region in which the vertically articulated robot LB does not interfere with itself on any account.

On the other hand, if a posture in which self-interference does not actually occur is included in the self-interference region, even if it is determined that self-interference occurs, the vertically articulated robot LB cannot simply assume this posture. Thus, movement of the vertically articulated robot LB is limited, but self-interference does not occur. Therefore, if a posture in which self-interference does not actually occur is included in the self-interference region, there is no problem in particular.

The joints J1 to J3 adjacent to each other on the base side of the vertically articulated robot LB contribute to determining the position of the tip end of the vertically articulated robot LB, and the joints J4 to J6 adjacent to each other on the tip end side of the vertically articulated robot LB contribute to determining the posture of the tip end, and thus determination regarding self-interference is performed separately for the joints J1 to J3 on the base side and the joints J4 to J6 on the tip end side.

Joints that are suitable for calculating a self-interference region and a non-self-interference region are selected as specific joints in advance. Which joint is suitable for calculating a self-interference region and a non-self-interference region is determined based on the shapes of the links and the movable ranges of the joints.

For example, in one or more embodiments, the link L1 connected to the joint J1 from among the joints J1 to J3 on the base side pivots about the axis S1. In consideration of this pivoting, whether or not self-interference occurs depends significantly on the angles of rotation of the joints J2 to J6, other than the joint J1. Therefore, when the joint J1 is defined as a specific joint, compared with a case where the joints J2 and J3 are defined as specific joints, a detail determination region that does not belong to the self-interference region or the non-self-interference region is larger. As will be described later, the detail determination region is a region for which determination regarding self-interference needs to be performed based on three-dimensional models, and thus the larger the detail determination region is, the longer the time required for determination regarding self-interference is. Therefore, compared with the case where the joints J2 and J3 are defined as specific joints, setting the joint J1 as a specific joint is not suitable for calculating a self-interference region and a non-self-interference region. Thus, one joint or a combination of the joints J1 to J3 on the base side is taken as a specific joint or specific joints, the size of a detail determination region in a case of the one or more specific joints is compared with the size of a detail determination region in a case of another, and the joint(s) for which the detail determination region is the smallest is taken as the specific joint(s). Note that a three-dimensional model is a model representing the shape of the links of the vertically articulated robot LB arranged in a three-dimensional space.

In addition, a specific joint is determined from among the joints J4 to J6 on the tip end side, similarly to the joints J1 to J3 on the base side. For example, the end effector connected to the joint J6 pivots about the axis S6. In consideration of this pivoting, whether or not self-interference occurs depends significantly on the angles of rotation of the joints J1 to J5, other than the joint J6. Therefore, when the joint J6 is defined as a specific joint, compared with a case where the joints J4 and J5 are defined as specific joints, a detail determination region that does not belong to a self-interference region or a non-self-interference region is larger. Thus, determination regarding self-interference takes time. Therefore, setting the joint J6 as a specific joint is not suitable for calculating a self-interference region and a non-self-interference region, compared with the case where the joints J4 and J5 are defined as specific joints.

In one or more embodiments, as an example, a case will be described in which the joints J2 and J3 from among the joints J1 to J3 on the base side of the vertically articulated robot LB are defined as specific joints, and the joints J4 and J5 from among the joints J4 to J6 on the tip end side of the vertically articulated robot LB are defined as specific joints.

The acquisition unit 102 acquires region information calculated by the calculation unit 101. Note that region information calculated by an external apparatus may also be acquired in place of the region information calculated by the calculation unit 101.

The determination unit 103 determines whether or not the vertically articulated robot LB interferes with itself, by determining whether the coordinates indicating the posture that is determined by the angles of rotation of the specific joints belong to a self-interference region or a non-self-interference region indicated by the region information acquired by the acquisition unit 102.

The storage unit 104 stores a region information calculation program and a self-interference determination program, which will be described later, region information calculated by the calculation unit 101, shape data of the base link BL and the links L1 to L6 of the vertically articulated robot LB, information regarding the movable ranges of the joints J1 to J6, shape data of the end effector connected to the joint J6, shape data of a work piece to be processed by the end effector, and the like.

The interference determination apparatus 10 is connected to a path search apparatus 20. Path planning of the vertically articulated robot LB is generated as a list of postures when operating the vertically articulated robot LB from its initial posture to a target posture. When performing path planning, the interference determination apparatus 10 determines whether or not self-interference occurs with any of the postures retrieved by the path search apparatus 20.

The path search apparatus 20 determines an amount and direction in which the vertically articulated robot LB is to be moved from the current posture, and searches for the next posture. The interference determination apparatus 10 determines whether or not self-interference occurs with the posture retrieved by the path search apparatus 20, and notifies the path search apparatus 20 of the determination result. If it is determined that self-interference does not occur with the retrieved posture, the path search apparatus 20 adds the posture to the list of postures. On the other hand, if it is determined that self-interference occurs, another posture is searched for, and the interference determination apparatus 10 is requested to perform self-interference determination. By repeating path search processing that is performed by the path search apparatus 20 and interference determination processing that is performed by the interference determination apparatus 10 in this manner, path planning is performed.

Next, effects of the interference determination apparatus 10 will be described.

Figure 4:
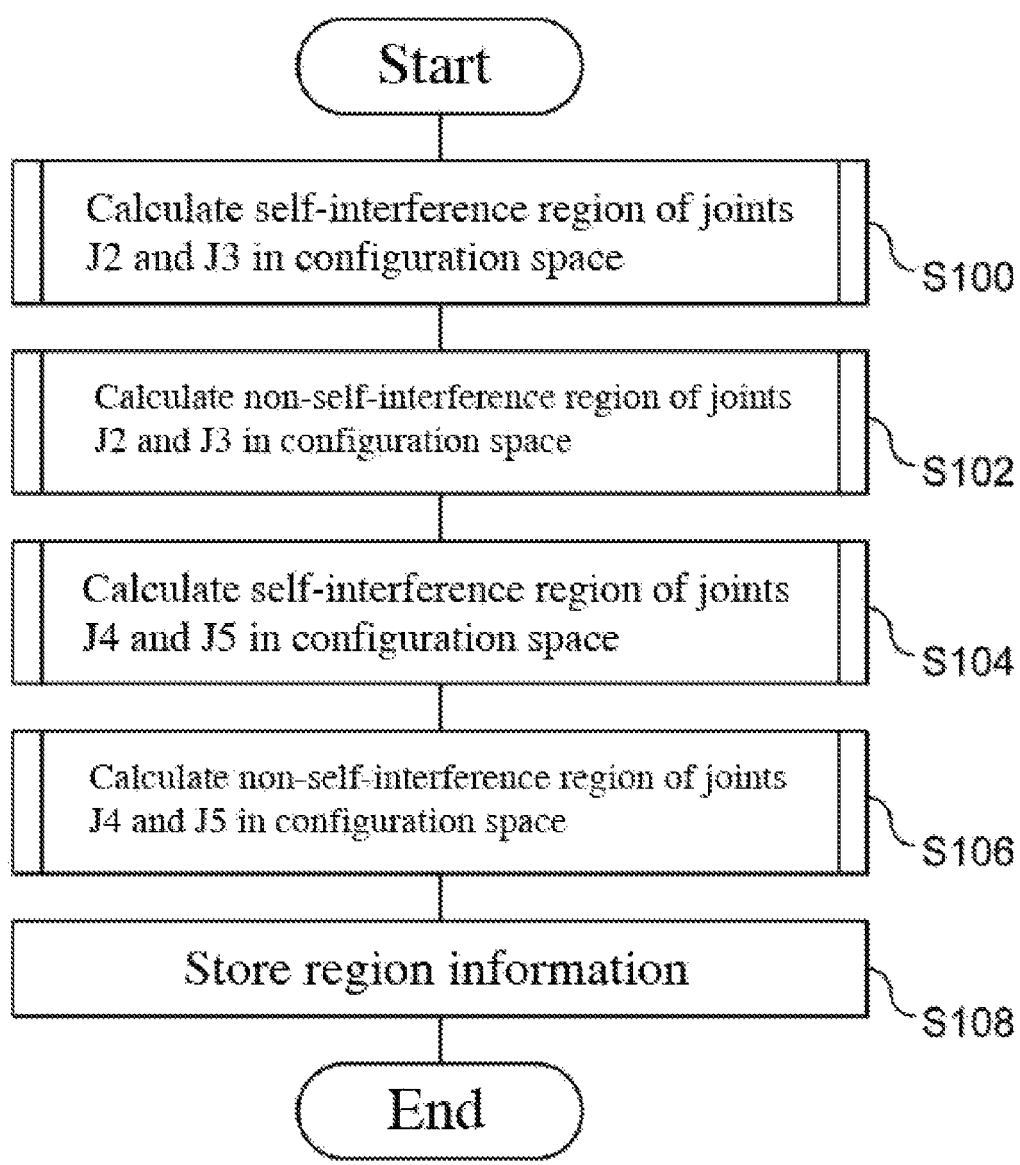
FIG. 4 is a flow diagram illustrating a flow of a main routine of region information calculation processing.

FIG. 4 is a flowchart showing a flow of region information calculation processing that is executed by the CPU 11 of the interference determination apparatus 10. The region information calculation processing is executed by the CPU 11 reading out the region information calculation program from the ROM 12 or the storage 14, loading the program to the RAM 13, and executing the program. The region information calculation processing is executed before interference determination processing that is executed when performing path planning of the vertically articulated robot LB.

Figure 5:
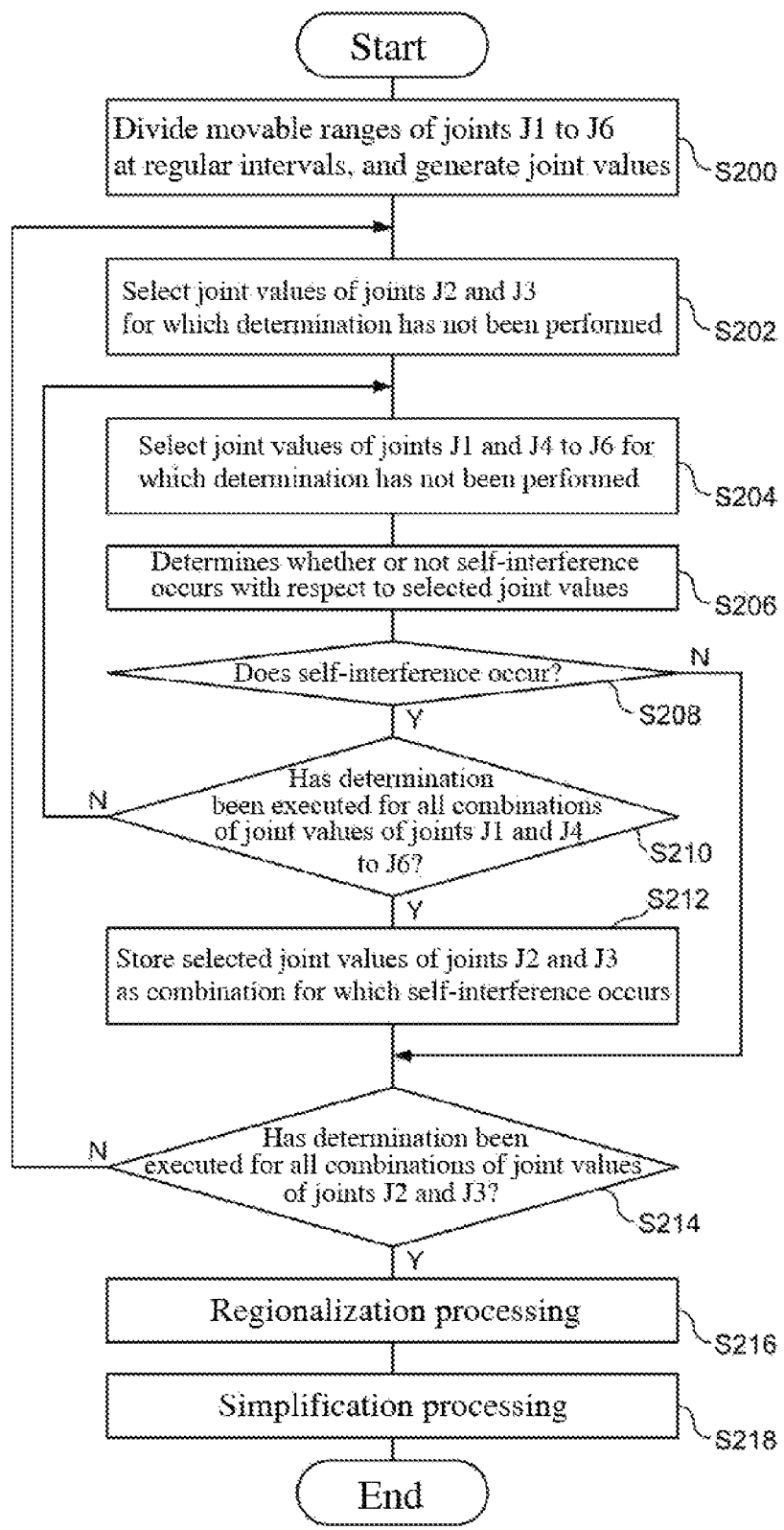
FIG. 5 is a flow diagram illustrating a flow of a subroutine of region information calculation processing.

The CPU 11 functions as the calculation unit 101, and calculates a self-interference region of the joints J2 and J3 in a configuration space (step S100). Specifically, self-interference region calculation processing shown in FIG. 5 is executed, and a self-interference region of the joints J2 and J3 is calculated. The self-interference region calculation processing in FIG. 5 will be described later.

Figure 6:
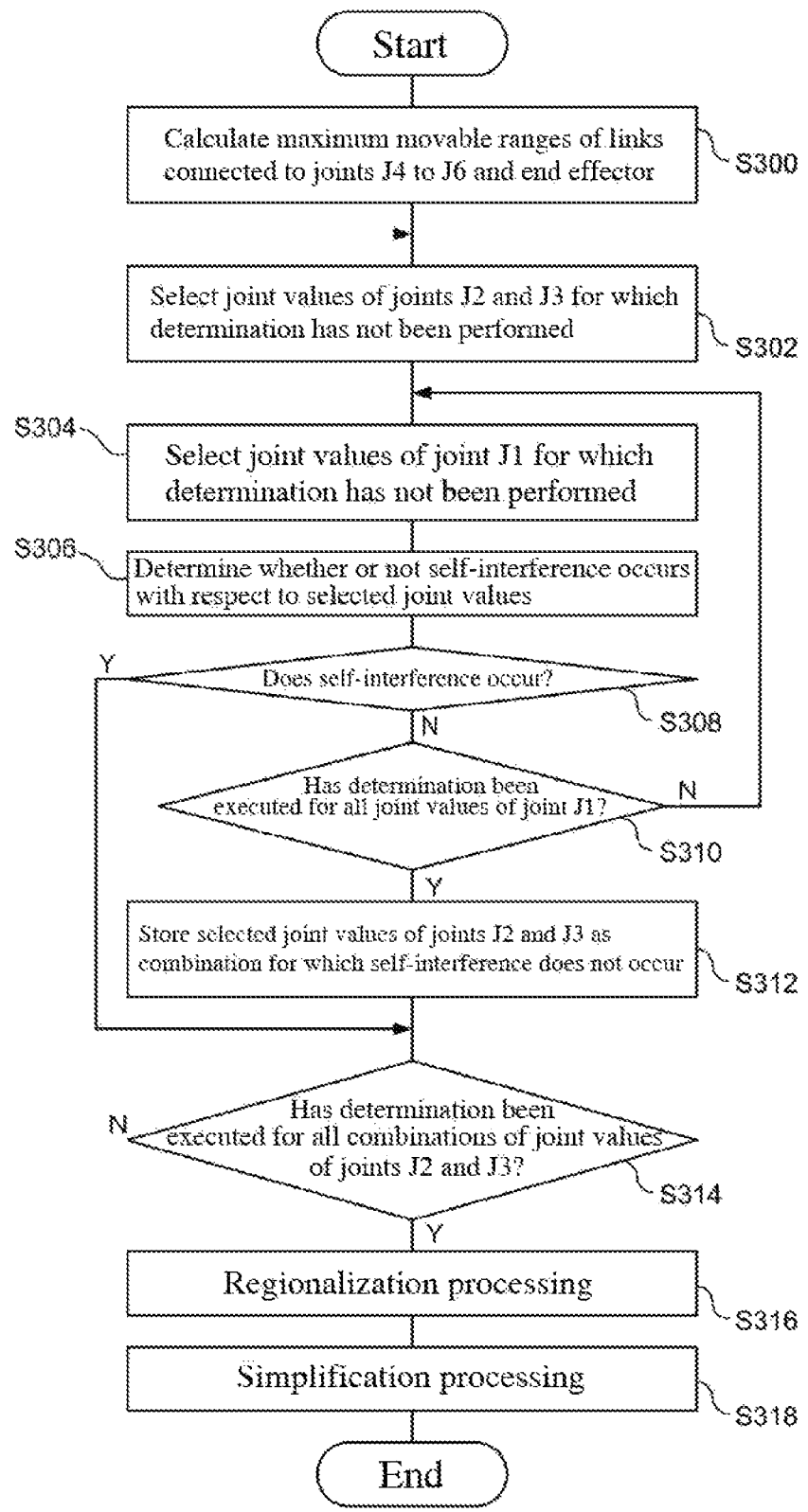
FIG. 6 is a flow diagram illustrating a flow of a subroutine of region information calculation processing.

The CPU 11 functions as the calculation unit 101, and calculates a non-self-interference region of the joints J2 and J3 in the configuration space (step S102). Specifically, non-self-interference region calculation processing shown in FIG. 6 is executed, and a non-self-interference region of the joints J2 and J3 is calculated. The non-self-interference region calculation processing in FIG. 6 will be described later. Note that information regarding the self-interference region that is calculated in step S100 and information regarding the non-self-interference region that is calculated in step S102 are examples of first region information in one or more embodiments.

Figure 7:
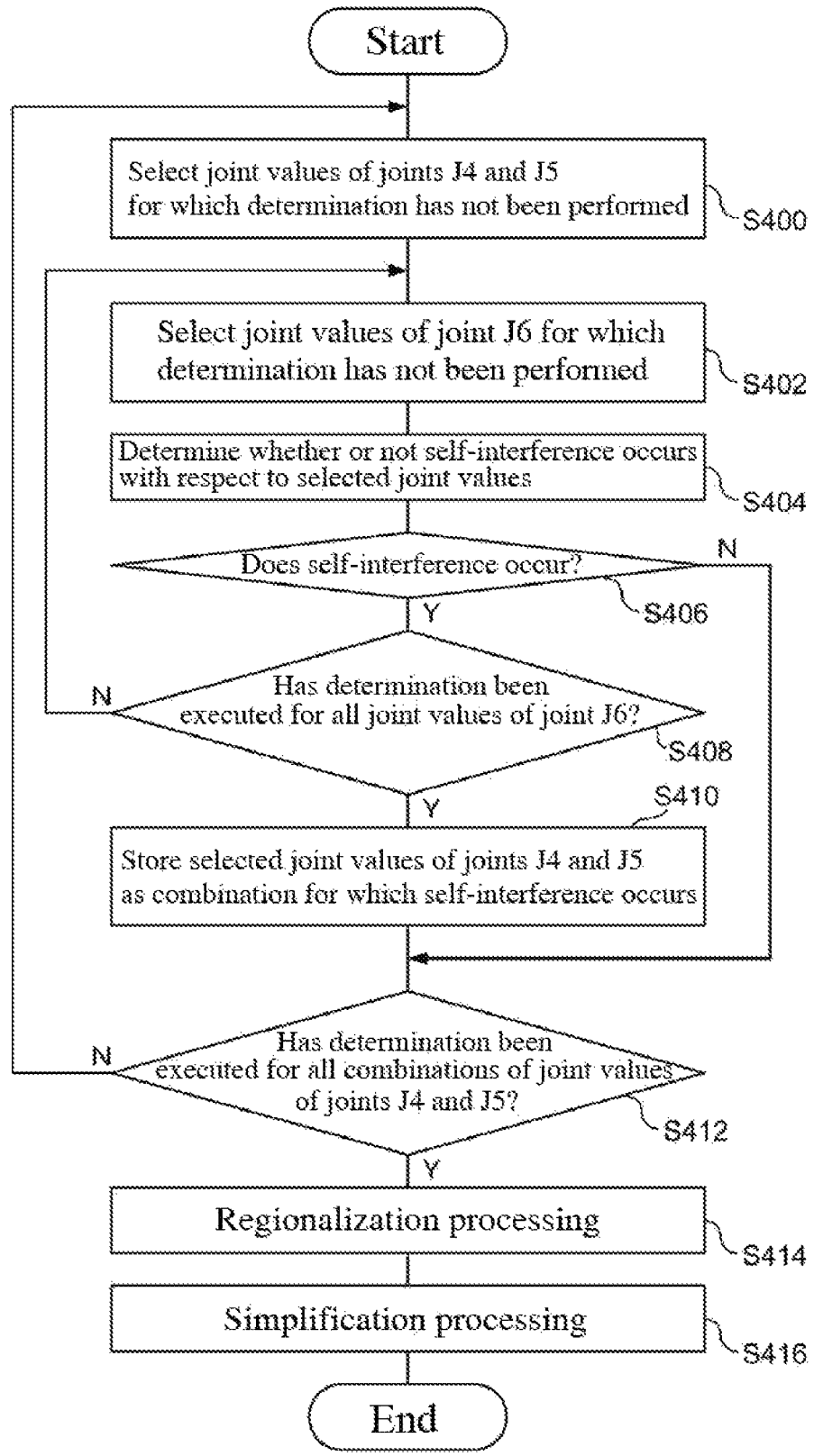
FIG. 7 is a flow diagram illustrating a flow of a subroutine of region information calculation processing.

The CPU 11 functions as the calculation unit 101, and calculates a self-interference region of the joints J4 and J5 in the configuration space (step S104). Specifically, self-interference region calculation processing shown in FIG. 7 is executed, and a self-interference region of the joints J4 and J5 is calculated. The self-interference region calculation processing in FIG. 7 will be described later.

Figure 8:
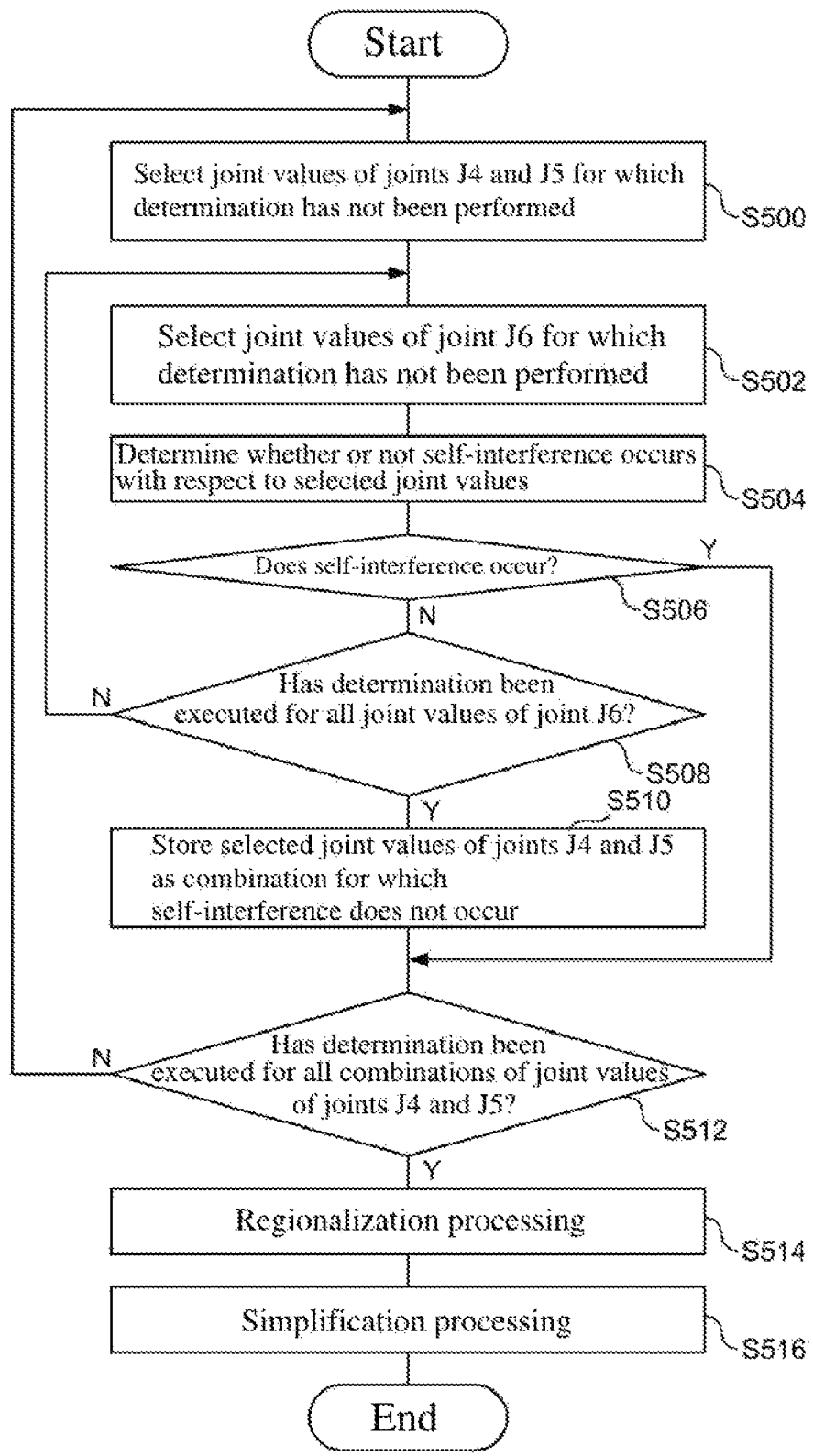
FIG. 8 is a flow diagram illustrating a flow of a subroutine of region information calculation processing.

The CPU 11 functions as the calculation unit 101, and calculates a non-self-interference region of the joints J4 and J5 in the configuration space (step S106). Specifically, non-self-interference region calculation processing shown in FIG. 8 is executed, and a non-self-interference region of the joints J4 and J5 is calculated. The non-self-interference region calculation processing in FIG. 8 will be described later. Note that information regarding the self-interference region calculated in step S104 and information regarding the non-self-interference region calculated in step S106 are examples of second region information in one or more embodiments.

The CPU 11 stores, to the storage 14, the information indicating the self-interference region of the joints J2 and J3 in the configuration space calculated in step S100, the information indicating the non-self-interference region of the joints J2 and J3 in the configuration space calculated in step S102, the information indicating the self-interference region of the joints J4 and J5 in the configuration space calculated in step S104, and the information indicating the non-self-interference region of the joints J4 and J5 in the configuration space calculated in step S106, as region information (step S108).

Next, the processing for calculating a self-interference region of the joints J2 and J3 will be described with reference to FIG. 5.

The CPU 11 divides the movable range of each of the joints J1 to J6 by a predetermined number (e.g., 100) at regular intervals, and generates joint values (step S200). Note that a movable range may be divided by a predetermined angle (e.g., 1 degree). Note that a joint value is a value indicating the angle of rotation of a joint.

The CPU 11 selects a combination of joint values for which determination regarding whether or not self-interference occurs has not been performed, from among combinations of the joint values of the joints J2 and J3 generated in step S200 (step S202).

The CPU 11 selects a combination of joint values for which determination regarding whether or not self-interference occurs has not been performed, from among combinations of the joint values of the joints J1 and J4 to J6 generated in step S200 (step S204).

The CPU 11 determines whether or not the vertically articulated robot LB interferes with itself in a posture indicated by the joint values of the joints J1 to J6 selected in steps S202 and S204 (step S206). Specifically, the shape data of the base link BL and the links L1 to L6 is acquired from the storage unit 104, and a three-dimensional model of the vertically articulated robot LB in the posture is generated. Whether or not there is a combination of links for which self-interference occurs, in other words whether or not there are links that interfere with each other is then determined based on the generated three-dimensional model.

If it is determined that self-interference does not occur (step S208: NO), the procedure transitions to step S214. On the other hand, if it is determined that self-interference occurs (step S208: YES), the CPU 11 determines whether or not the determination in step S206 has been executed for all of the combinations of the joint values of the joints J1 and J4 to J6 (step S210). If the determination in step S206 has not been executed for all of the combinations of the joint values of the joints J1 and J4 to J6 (step S210: NO), the procedure transitions to step S204. On the other hand, if the determination in step S206 has been executed for all of the combinations of the joint values of the joints J1 and J4 to J6 (step S210: YES), the CPU 11 stores, to the storage unit 104, the combination of the joint values of the joints J2 and J3 selected in step S202 as a combination of joint values for which self-interference occurs (step S212).

The CPU 11 determines whether or not determination regarding self-interference has been performed for all of the combinations of the joint values of the joints J2 and J3 (step S214). If determination regarding self-interference has not been performed for all of the combinations of the joint values of the joints J2 and J3 (step S214: NO), the procedure transitions to step S202.

Figure 9:
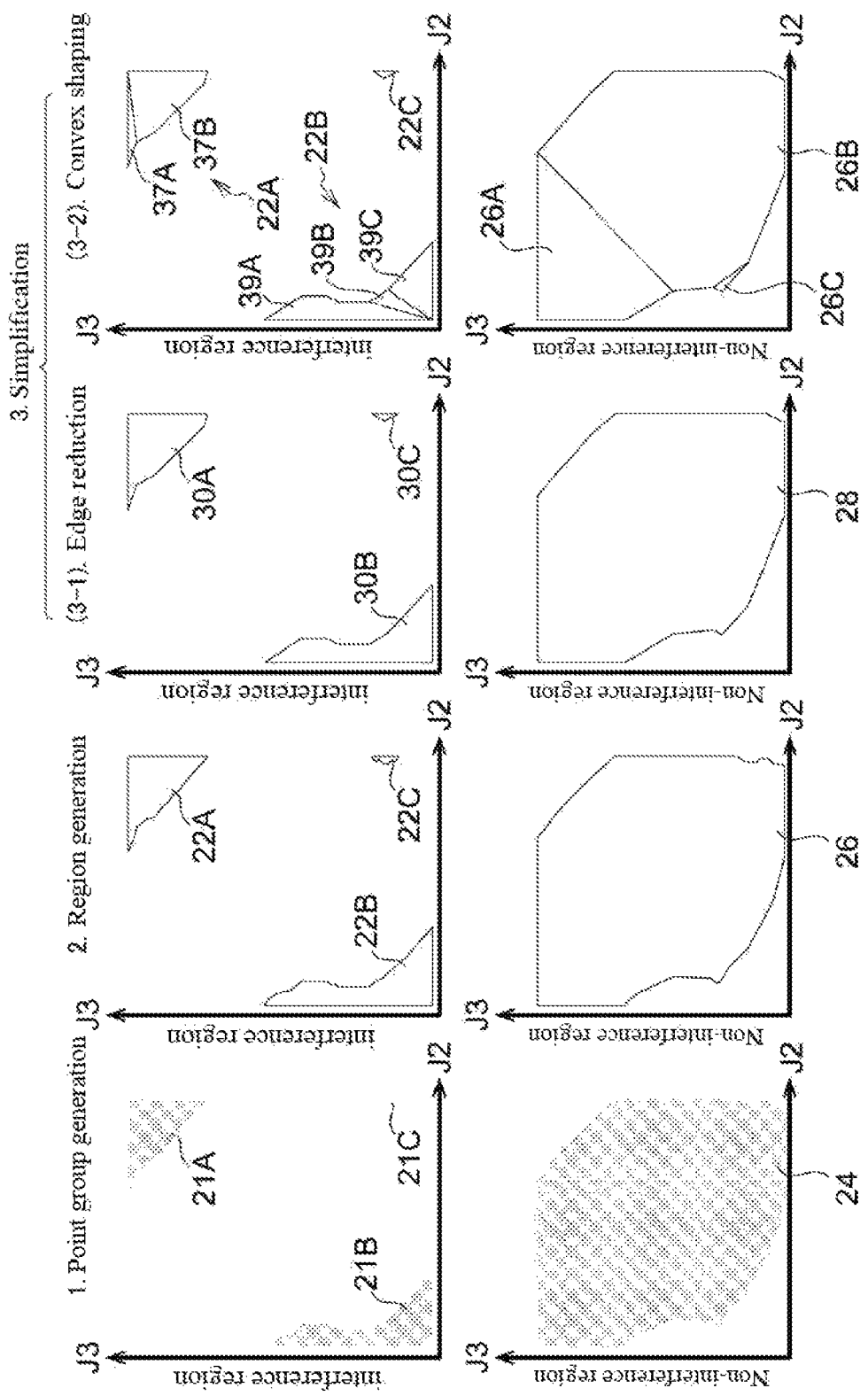
FIG. 9 is a diagram illustrating examples of a self-interference region and a non-self-interference region in a configuration space.

If determination regarding self-interference has been performed for all of the combinations of the joint values of the joints J2 and J3 (step S214: YES), the CPU 11 defines, as regions, sets of joint values of the joints J2 and J3 for which it was determined that self-interference occurs (step S216). As an example, FIG. 9 shows point groups 21A to 21C that are sets of joint values of the joints J2 and J3 for which it was determined that self-interference occurs. In step S216, a region that includes each of the entire point groups 21A to 21C, for example, a region that is formed as a bounding box is defined as a self-interference region. Specifically, a region acquired by connecting outer points of each of the point groups 21A to 21C using straight lines (hereinafter, referred to as edges) is defined as a self-interference region. Accordingly, for example, self-interference regions 22A to 22C shown in FIG. 9 are obtained.

The CPU 11 simplifies the shapes of the self-interference regions so as to fit within the outlines of the self-interference regions defined as such in step S216 (step S218). Examples of a simplifying method include edge reduction processing and convex shaping processing.

Figure 10:
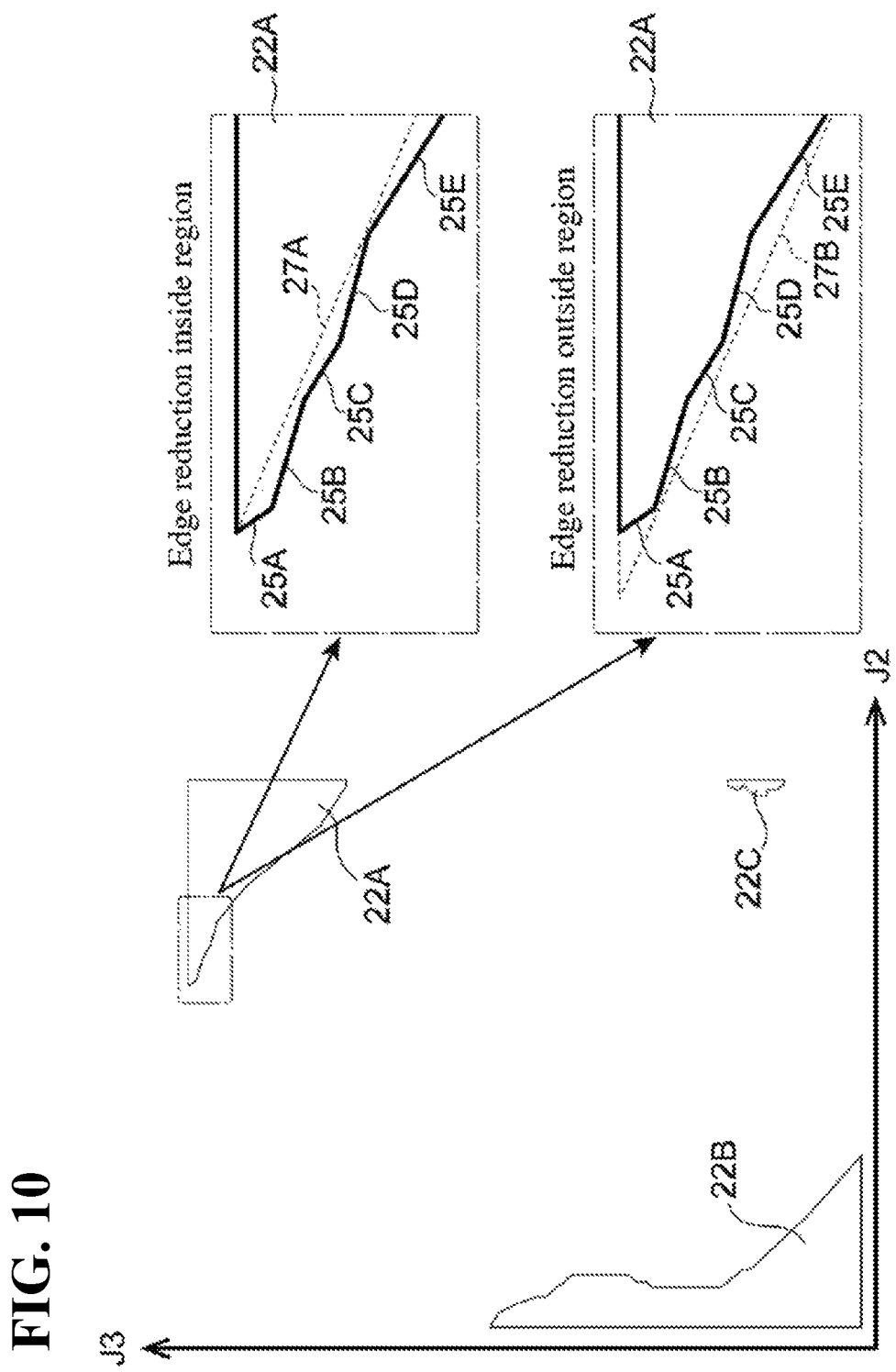
FIG. 10 is a diagram illustrating edge reduction processing.

Edge reduction processing will be described below. For example, as shown in FIG. 10, by integrating a plurality of edges of each of the self-interference regions 22A to 22C into one edge, the self-interference region is simplified. Specifically, for example, as shown in FIG. 10, simplification is performed by replacing a plurality of edges 25A to 25E of the self-interference region 22A with one edge 27A or 27B. Note that the edge 27A is arranged inside of the self-interference region 22A, and the edge 27B is arranged outside of the self-interference region 22A. If an edge is arranged inside the self-interference region 22A as with the case of the edge 27A, the self-interference region becomes smaller after simplification. Thus, in actuality, the likelihood decreases that a posture in which self-interference does not occur being included in the self-interference region after simplification decreases, and thus the accuracy of determination improves. On the other hand, if an edge is arranged outside of the self-interference region 22A as with the case of the edge 27B, the self-interference region becomes larger after simplification. Thus, postures that are originally in a detail determination region are also included in a self-interference region, but the self-interference region becomes larger, and thus the time required for determination is shortened.

By executing edge reduction processing on the self-interference regions 22A to 22C in this manner, self-interference regions 30A to 30C as shown in FIG. 9 are generated. Note that, hereinafter, the self-interference regions 30A to 30C are simply referred to as "self-interference regions 30" if they are not distinguished from each other particularly.

Figure 11:
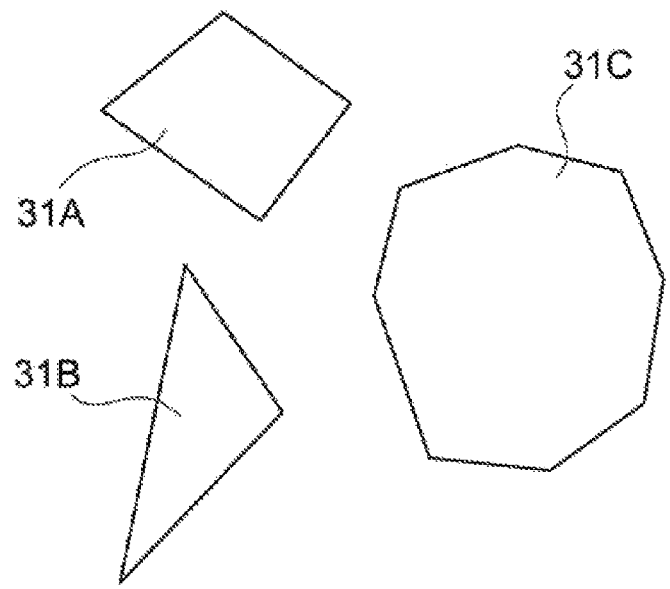
FIG. 11 is a diagram illustrating examples of convex shapes.
Figure 12:
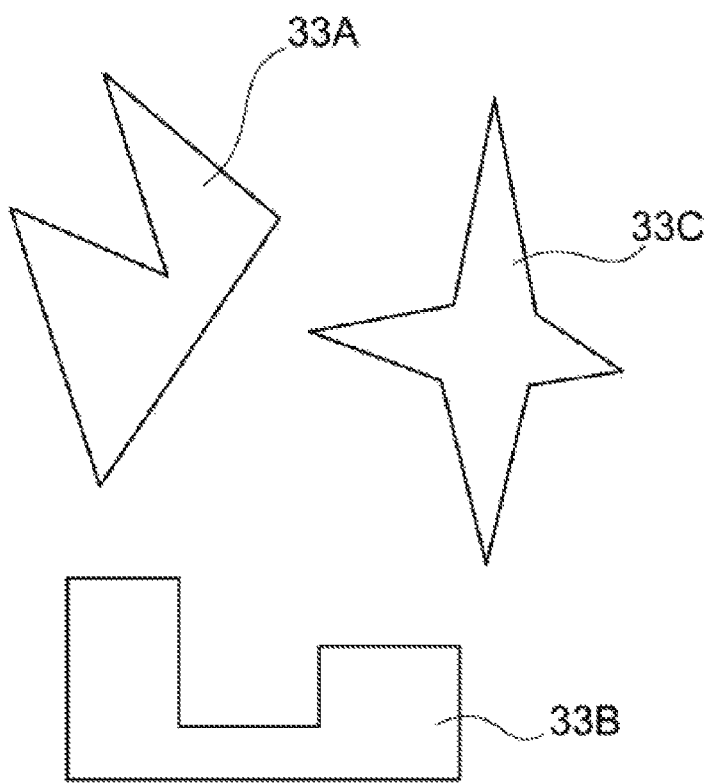
FIG. 12 is a diagram illustrating examples of concave shapes.
Figure 13:
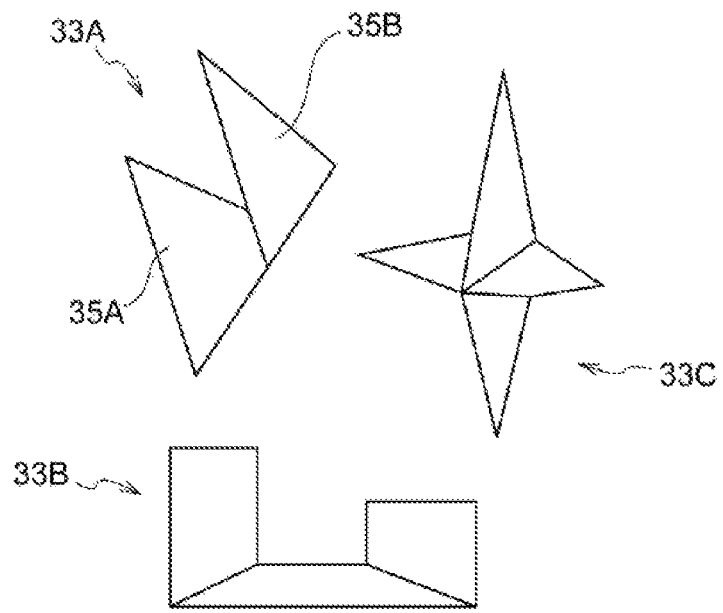
FIG. 13 is a diagram illustrating an example of convex shaping.

Next, convex shaping processing will be described. A convex shape refers to a shape without any recess. A two-dimensional convex shape is a convex polygon, and a three-dimensional convex shape is a convex polyhedron. For example, shapes 31A to 31C shown in FIG. 11 are convex shapes. In addition, a concave refers to a shape with a recess. For example, shapes 33A to 33C as shown in FIG. 12 are concaves. Convex shaping is to express a concave as a set of convex shapes. For example, the concave shape 33A shown in FIG. 12 can be expressed as a plurality of convex shapes 35A and 35B as shown in FIG. 13. Similarly, the shapes 33B and 33C can each be expressed as a plurality of convex shapes.

Therefore, when the self-interference region 22A shown in FIG. 9 is subjected to convex shaping, the self-interference region 22A is expressed as a plurality of convex shapes 37A and 37B, and when the self-interference region 22B is subjected to convex shaping, the self-interference region 22B is expressed as a plurality of convex shapes 39A to 39C. Note that the self-interference region 22C is originally a convex shape, and thus is not subjected to convex shaping. By performing convex shaping on a self-interference region in this manner, compared with a case where convex shaping is not performed, it is possible to shorten the time required for determining self-interference in the interference determination processing, which will be described later. Note that the simplifying processing in step S218 may also be omitted. That is to say, in the interference determination processing, which will be described later, determination regarding self-interference may also be performed using the self-interference regions 22A to 22C.

Figure 14:
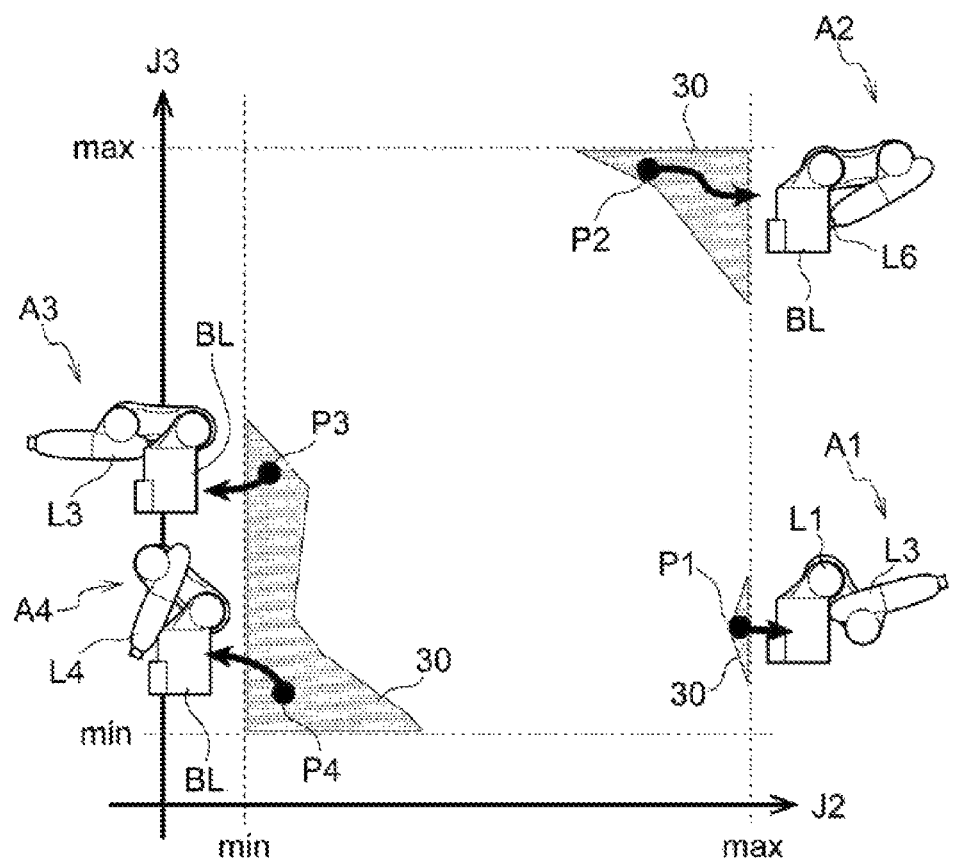
FIG. 14 is a diagram illustrating specific examples of self-interference on a base side.

FIG. 14 shows examples of postures of the vertically articulated robot LB in a self-interference region. As shown in FIG. 14, a posture A1 of the vertically articulated robot LB indicated by a point P1 plotted in the self-interference region 30 in a configuration space in which the joint values of the joints J2 and J3 are indicated by coordinate axes is a posture in which the link L3 and the link L1 interfere with each other. A posture A2 of the vertically articulated robot LB indicated by a point P2 plotted in the self-interference region 30 is a posture in which the link L6 and the base link BL interfere with each other. A posture A3 of the vertically articulated robot LB indicated by a point 3 plotted in the self-interference region 30 is a posture in which the link L3 and the base link BL interfere with each other. A posture A4 of the vertically articulated robot LB indicated by a point 4 plotted in the self-interference region 30 is a posture in which the link L4 and the base link BL interfere with each other.

Next, processing for calculating a non-self-interference region of the joints J2 and J3 will be described with reference to FIG. 6.

Figure 15:
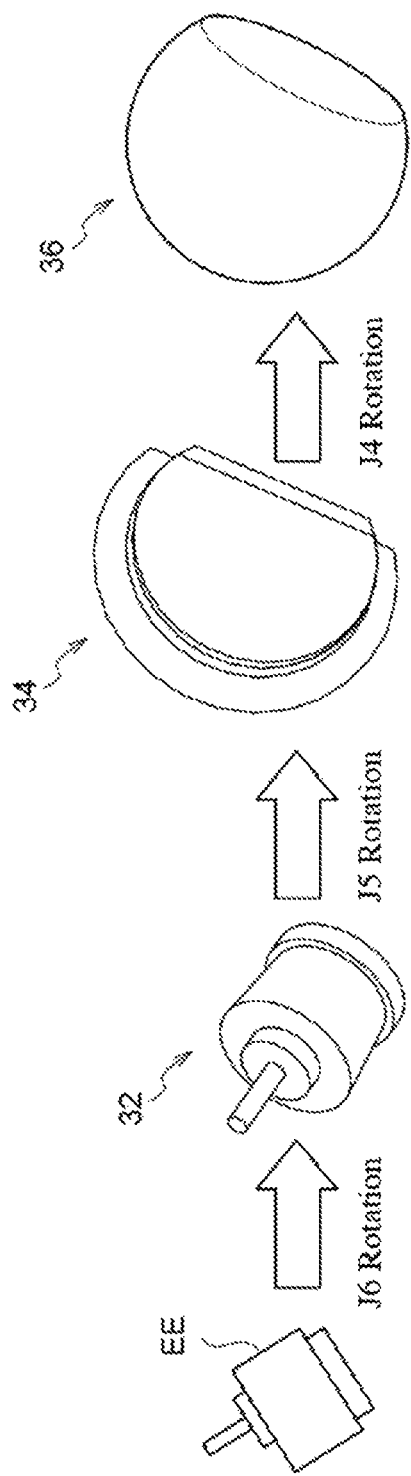
FIG. 15 is a diagram illustrating maximum movable ranges of links on a tip end side.
Figure 16:
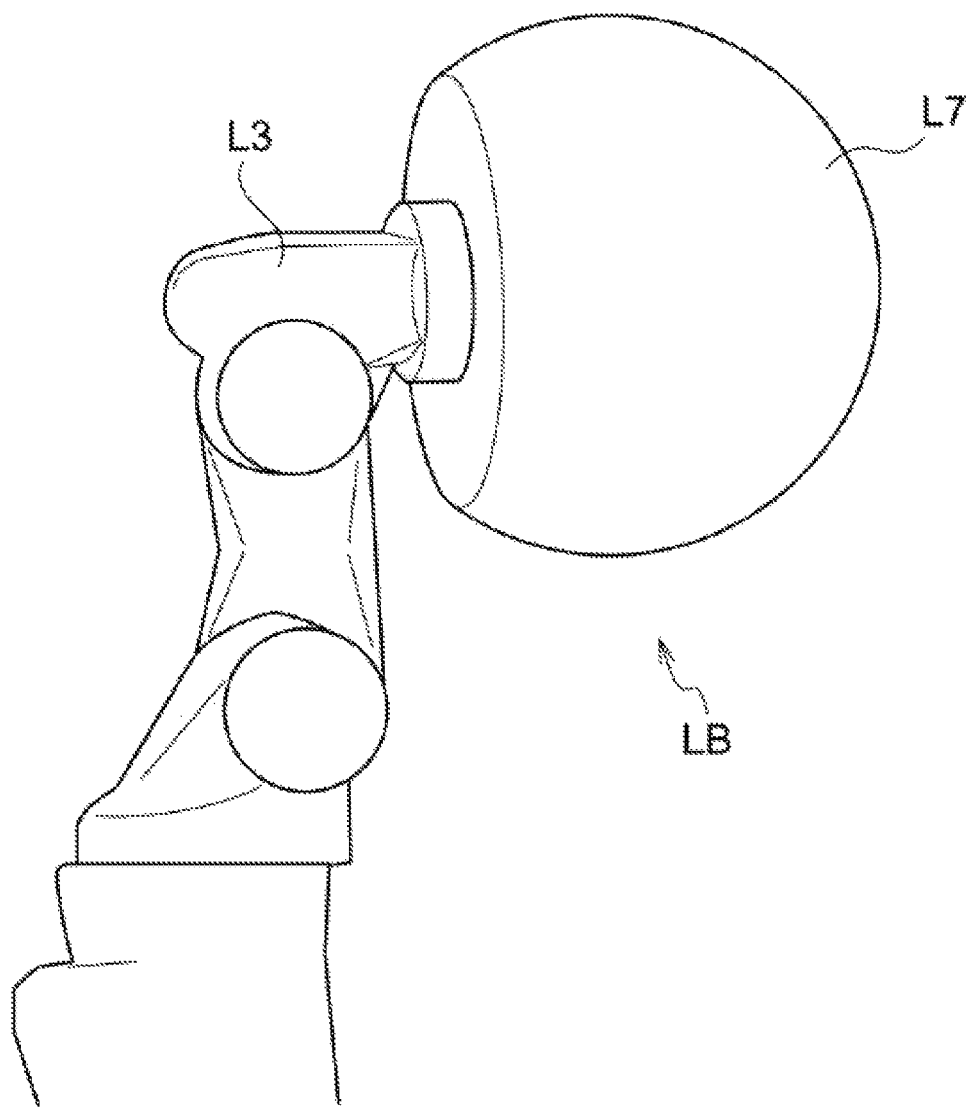
FIG. 16 is a diagram illustrating an example of a vertically articulated robot when maximum movable ranges of links on a tip end side are regarded as a link.

The CPU 11 calculates maximum movable ranges of the links L4 to L6 connected to the joints J4 to J6 and the end effector (step S300). Specifically, first, the shape data of the link L4 to L6 connected respectively to the joints J4 to J6 and the shape data of the end effector connected to the joint J6 are read out from the storage unit 104. The maximum movable ranges of the links L4 to L6 and end effector when the joints J4 to J6 are moved in their entire movable ranges are then calculated. For example, as shown in FIG. 15, when the joint J6 to which the end effector (EE) is connected is moved over the entire movable range, the maximum region in which the end effector (EE) is movable is a maximum movable range 32. In addition, when the joint J5 is moved over the entire movable range, the maximum region in which the end effector (EE) and the link L6 are movable is a maximum movable range 34. In addition, when the joint J4 is moved over the entire movable range, the maximum region in which the end effector (EE), the link L6, and the link L5 are movable is a maximum movable range 36. In this case, it is conceivable that the vertically articulated robot LB has a configuration in which the link L7 having a shape represented as the maximum movable range 36 shown in FIG. 15 is connected to the link L3, as shown in FIG. 16. In this manner, a maximum movable range of the links L4 to L6 and the end effector (EE) is calculated when calculating a non-self-interference region, since, if self-interference does not occur in a state where a link represented as a maximum movable range is connected, it can be determined that self-interference does not occur on any account whatever posture the links L4 to L6 and the end effector (EE) are in.

The CPU 11 selects, from among the combinations of joint values of the joints J2 and J3 generated in step S200 in FIG. 5, a combination of joint values for which determination regarding self-interference has not been performed (step S302).

The CPU 11 selects a joint value for which determination regarding self-interference has not been performed from among the joint values of the joint J1 generated in step S200 in FIG. 5 (step S304).

The CPU 11 determines whether or not self-interference occurs in a posture of the vertically articulated robot LB indicated by the joint values of the joints J1 to J3 selected in steps S302 and S304 (step S306). Specifically, the shape data of the base link BL and the links L1 to L3 is acquired from the storage unit 104. A three-dimensional model of the vertically articulated robot LB constituted by the base link BL, the links L1 to L3, and the link L7 is then generated based on the acquired shape data of the base link BL and the links L1 to L3 and the shape data of the link L7 calculated in step S300. Subsequently, whether or not self-interference occurs is determined based on the generated three-dimensional model.

If it is determined that self-interference occurs (step S308: YES), the procedure transitions to step S314. On the other hand, if it is determined that self-interference does not occur (step S308: NO), the CPU 11 determines whether or not determination regarding self-interference has been executed for all of the joint values of the joint J1 (step S310). If the determination regarding self-interference has not been executed for all of the joint values of the joint J1 (step S310: NO), the procedure transitions to step S304. On the other hand, if determination regarding self-interference has been executed for all of the joint values of the joint J1 (step S310: YES), the CPU 11 stores, to the storage unit 104, the combination of the joint values of the joints J2 and J3 selected in step S302, as a combination of joint values for which self-interference does not occur (step S312).

The CPU 11 determines whether or not determination regarding self-interference has been executed for all of the combinations of joint values of the joints J2 and J3 (step S314). If determination regarding self-interference has not been performed for all of the combinations of the joint values of the joints J2 and J3 (step S314: NO), the procedure transitions to step S302. If determination regarding self-interference has been performed for all of the combinations of the joint values of the joints J2 and J3 (step S314: YES), the CPU 11 regionalizes a set of joint values of the joints J2 and J3 for which it was determined that self-interference does not occur (step S316). FIG. 9 shows a point group 24 that is the set of the joint values of the joints J2 and J3 for which it was determined that self-interference does not occur, as an example. In step S316, a region that includes the entire point group 24, for example, a region turned into a bounding box is defined as a non-self-interference region. Specifically, a region obtained by connecting outer points in the point group 24 using straight lines is defined as a non-self-interference region. Accordingly, the non-self-interference region 26 shown in FIG. 9 is obtained, for example.

The CPU 11 simplifies the shape of the non-self-interference region so as to fit within the outline of the non-self-interference region regionalized in step S316 (step S318). Examples of a simplifying method include edge reduction processing and convex shaping processing, similarly to the above-described case of simplifying the shape of a self-interference region.

As described above, a non-self-interference region needs to be a region in which the vertically articulated robot LB does not interfere with itself on any account. Thus, in the case of executing edge reduction processing on the non-self-interference region 26, when replacing a plurality of edges of the non-self-interference region 26 with one edge, this edge is arranged within the non-self-interference region 26. In other words, edge reduction processing is executed so as to ensure that a non-self-interference region obtained after edge reduction is smaller than the non-self-interference region 26. If edge reduction processing is executed on the non-self-interference region 26 in this manner, a non-self-interference region 28 as shown in FIG. 9 is obtained, for example. In addition, if convex shaping is performed on the non-self-interference region 26, the non-self-interference region 26 is expressed as a plurality of convex shapes 26A to 26C. By performing convex shaping on the non-self-interference region in this manner, compared with a case where convex shaping is not performed, it is possible to shorten the time required for determination regarding self-interference in interference determination processing, which will be described later.

Figure 17:
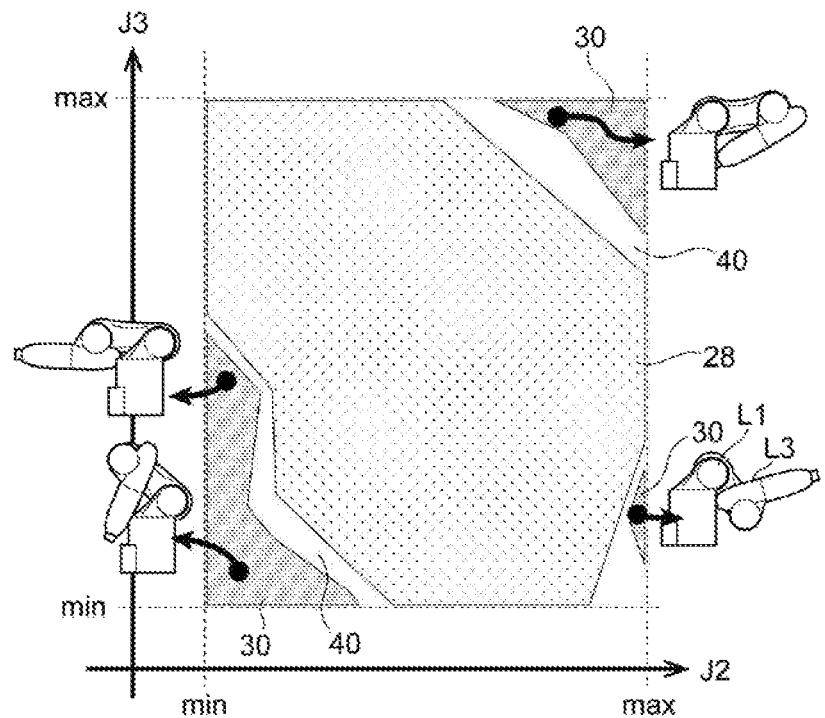
FIG. 17 is a diagram illustrating detail determination regions.

As shown in FIG. 17, any region that does not belong to the self-interference region 30 or the non-self-interference region 28 is defined as a detail determination region 40.

Note that a main reason for a detail determination region that is not included in a self-interference region or a non-self-interference region is that self-interference occurs in some cases and self-interference does not occur in other cases depending on the shapes of the links L4 and L5, and L6, and the end effector (EE) arranged in the three-dimensional space.

Next, processing for calculating a self-interference region of the joints J4 and J5 will be described with reference to FIG. 7.

The CPU 11 selects a combination of joint values for which determination as to whether or not self-interference occurs has not been performed, from among combinations of the joint values of the joints J4 and J5 generated in step S200 in FIG. 5 (step S400).

The CPU 11 selects a joint value for which determination as to whether or not self-interference occurs has not been performed, from among the joint values of the joint J6 generated in step S200 in FIG. 5 (step S402).

The CPU 11 determines whether or not self-interference occurs in a posture on the tip end side of the vertically articulated robot LB indicated by the joint values of the joints J4 to J6 selected in steps S400 and S402 (step S404). Specifically, shape data of the links L4 to L6 is acquired from the storage unit 104, and a three-dimensional model in the posture on the tip end of the vertically articulated robot LB is generated. Whether or not there is a combination of links in which self-interference occurs, in other words a combination of links that interfere with each other is then determined based on the generated three-dimensional model. In this manner, determination as to self-interference is performed in consideration of only the links L4 to L6 on the tip end side and the end effector (EE) without taking the links L1 to L3 on the base side into consideration.

If it is determined that self-interference does not occur (step S406: NO), the procedure transitions to step S412. On the other hand, if it is determined that self-interference occurs (step S406: YES), the CPU 11 determines whether or not the determination in step S406 has been executed for all of the joint values of the joint J6 (step S408). If the determination in step S406 has been executed for all of the joint values of the joint J6 (step S408: YES), the CPU 11 stores, to the storage unit 104, the combination of the joint values of the joints J4 and J5 selected in step S400, as a combination of self-interference (step S410). On the other hand, if the determination in step S406 has not been executed for all of the joint values of the joint J6 (step S408: NO), the procedure transitions to step S402.

The CPU 11 determines whether or not the processes in steps S402 to S410 have been executed for all of the combinations of the joint values the joints J4 and J5 (step S412). If the processes in steps S402 to S410 have not been executed for all of the combinations of joint values of the joints J4 and J5 (step S412: NO), the procedure transitions to step S400. On the other hand, if the processes in steps S402 to S410 have been executed for all of the combinations of the joint values of the joints J4 and J5 (step S412: YES), the CPU 11 regionalizes a set of joint values of the joints J4 and J5 for which it was determined that self-interference occurs, as a self-interference region (step S414). This processing is similar to the processing in step S216 in FIG. 5, and thus a description thereof is omitted.

Figure 18:
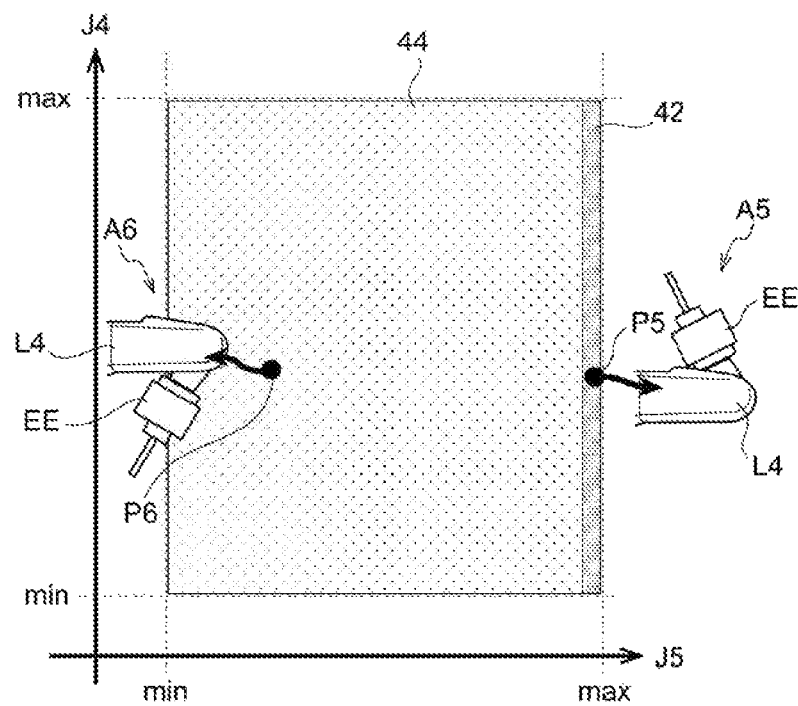
FIG. 18 is a diagram illustrating a specific example of a self-interference region and a non-self-interference region on a tip end side.

The CPU 11 simplifies the shape of the self-interference region so as to fit within the outline of the self-interference region regionalized in step S414 (step S416). This processing is similar to the processing in step S218 in FIG. 5, and thus a description thereof is omitted. Accordingly, a self-interference region 42 as shown in FIG. 18 is obtained, for example.

Next, processing for calculating a non-self-interference region of the joints J4 and J5 will be described with reference to FIG. 8.

The processes in step S500 to S504 are similar to the processes in steps S400 to S404 in FIG. 7, and thus a description thereof is omitted.

If it is determined that self-interference occurs (step S506: YES), the procedure transitions to step S512. On the other hand, it is determined that self-interference does not occur (step S506: NO), the CPU 11 determines whether or not the determination in step S506 has been executed for all of the joint values of the joint J6 (step S508). If the determination in step S506 has been executed for all of the joint values of the joint J6 (step S508: YES), the CPU 11 stores, to the storage unit 104, the combination of the joint values of the joints J4 and J5 selected in step S500 as a combination of non-self-interference (step S510). On the other hand, if the determination in step S506 has not been executed for all of the joint values of the joint J6 (step S508: NO), the procedure transitions to step S502.

The processes in steps S512 and S514 are similar to the processes in steps S412 and S414 in FIG. 7, and the process in step S516 is similar to the process in step S318 in FIG. 6, and thus a description thereof is omitted. Accordingly, for example, a non-self-interference region 44 as shown in FIG. 18 is obtained.

In addition, FIG. 18 shows examples of a posture on the tip end side of the vertically articulated robot LB in a self-interference region and a non-self-interference region. As shown in FIG. 18, a posture A5 of the vertically articulated robot LB indicated by a point 5 plotted in the self-interference region 42 in the configuration space in which joint values of the joints J4 and J5 are indicated by coordinate axis is a posture in which the link L4 and the end effector (EE) interfere with each other. In addition, a posture A6 of the vertically articulated robot LB indicated by a point 6 plotted in the non-self-interference region 44 is a posture in which self-interference does not occur.

Note that, in the example shown in FIG. 18, a detail determination region is hardly generated, but the size of the detail determination region differs according to the shapes of the links L4 to L6 on the tip end side and the end effector (EE).

Figure 19:
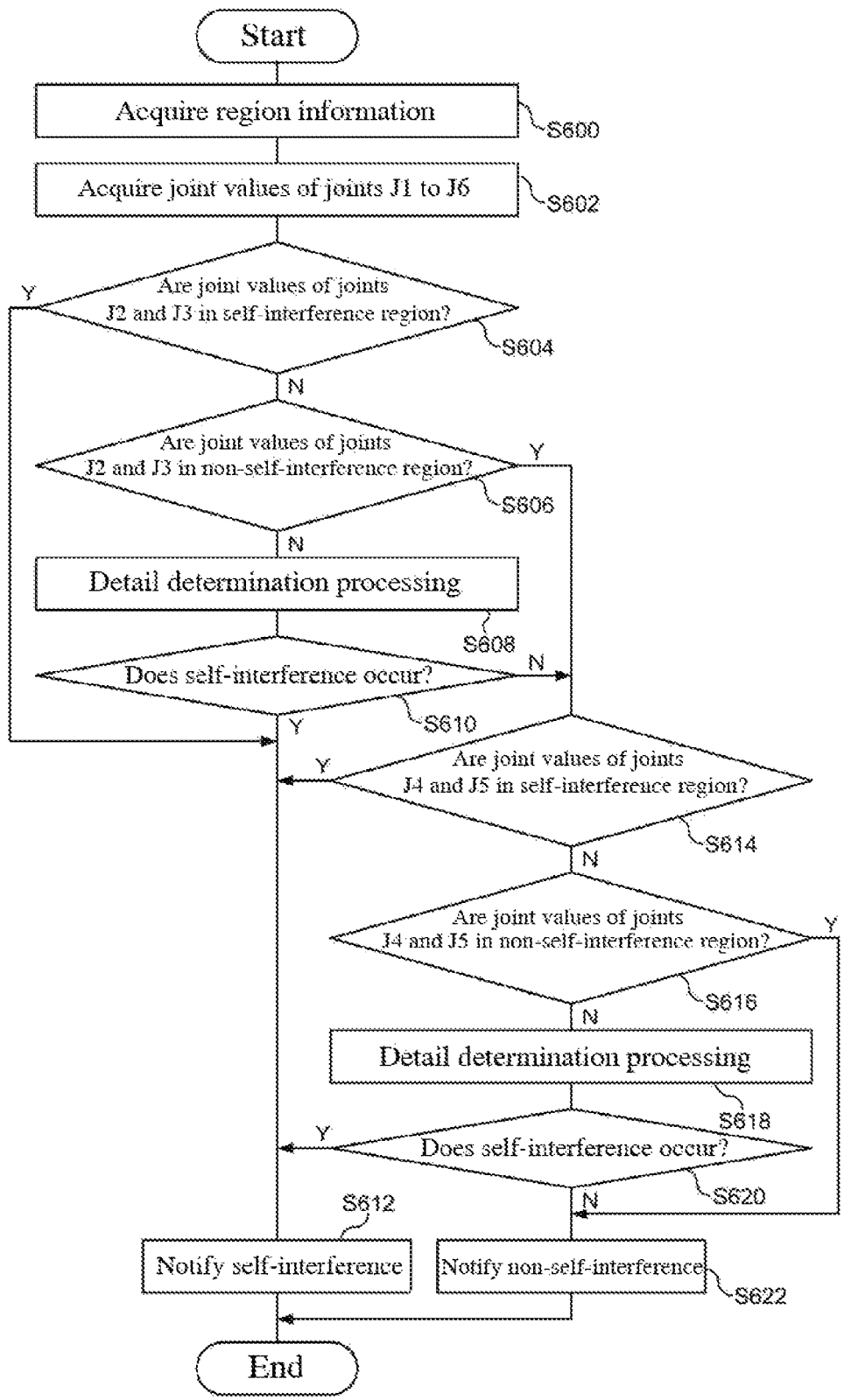
FIG. 19 is a flow diagram illustrating a flow of a main routine of interference determination processing.

Next, self-interference determination processing that is executed when performing path planning of the vertically articulated robot LB will be described. FIG. 19 is a flowchart showing a flow of the self-interference determination processing that is executed by the CPU 11 of the interference determination apparatus 10. The self-interference determination processing is executed by the CPU 11 reading out a self-interference determination program from the ROM 12 or the storage 14, loading the program to the RAM 13, and executing the program.

The CPU 11 functions as the acquisition unit 102, and acquires region information indicating the self-interference region and the non-self-interference region of the joints J2 and J3 in the configuration space and region information indicating the self-interference region and the non-self-interference region of the joints J4 and J5 in the configuration space, from the storage unit 104 (step S600).

The CPU 11 acquires joint values of the joints J1 to J6 that indicate a posture retrieved by the path search apparatus 20, from the path search apparatus 20 (step S602).

The CPU 11 determines whether or not the joint values of the joints J2 and J3 from among the joint values of the joints J1 to J6 acquired in step S502 are within the self-interference region of the joints J2 and J3 in the configuration space indicated by the region information acquired in step S600 (step S604).

If the joint values of the joints J2 and J3 are in the self-interference region (step S604: YES), the CPU 11 notifies the path search apparatus 20 that self-interference occurs in the posture indicated by the joint values of the joints J1 to J6 acquired in step S602 (step S612).

If the joint values of the joints J2 and J3 are not in the self-interference region (step S604: NO), the CPU 11 determines whether or not the joint values of the joints J2 and J3 are within the non-self-interference region of the joints J2 and J3 in the configuration space indicated by the region information acquired in step S600 (step S606).

If the joint values of the joints J2 and J3 are in the non-self-interference region (step S606: YES), the procedure transitions to step S614.

Figure 24:
FIG. 24 is a diagram illustrating a combination for which determination regarding self-interference needs to be performed.

If the joint values of the joints J2 and J3 are not in the non-self-interference region (step S606: NO), the CPU 11 determines in detail whether or not the vertically articulated robot LB interferes with itself (step S608). Specifically, the shape data of the base link BL and the links L1 to L3 is acquired from the storage unit 104. Three-dimensional models for 18 combinations of links for which the determination result is "yes" from among combinations of the base link BL and the links L1 to L3 shown in FIG. 24 are then generated, and processing for determining whether or not self-interference occurs is sequentially executed based on the generated three-dimensional models.

If it is determined that there is a combination of links that interfere with each other (step S610: YES), the CPU 11 notifies the path search apparatus 20 that self-interference occurs (step S612).

On the other hand, if it is determined that there is no combination of links that interfere with each other (step S610: NO), it is determined whether or not the joint values of the joints J4 and J5 from among the joint values of the joints J1 to J6 acquired in step S600 are in the self-interference region of the joints J4 and J5 in the configuration space indicated by the region information acquired in step S600 (step S614).

If the joint values of the joints J4 and J5 are in the self-interference region (step S614: YES), the CPU 11 notifies the path search apparatus 20 that self-interference occurs (step S612).

On the other hand, if the joint values of the joints J4 and J5 are not in the self-interference region (step S614: NO), the CPU 11 determines whether or not the joint values of the joints J4 and J5 are in the non-self-interference region of the joints J4 and J5 in the configuration space indicated by the region information acquired in step S500 (step S616).

If the joint values of the joints J2 and J3 are in the non-self-interference region (step S516: YES), the CPU 11 notifies the path search apparatus 20 that self-interference does not occur (step S622).

If the joint values of the joints J2 and J3 are not in the non-self-interference region (step S616: NO), the CPU 11 determines in detail whether or not self-interference occurs with the posture indicated by the joint values of the joints J1 to J6 acquired in step S602 (step S618). Specifically, the shape data of the links L4 and L5 is acquired from the storage unit 104. Three-dimensional models for three combinations of links for which the determination result is "yes" from among the combinations of the links L4 and L5 shown in FIG. 24 are then generated, and processing for determining whether or not self-interference occurs is sequentially executed based on the generated three-dimensional models.

If it is determined that there is a combination of links that interfere with each other (step S620: YES), the CPU 11 notifies the path search apparatus 20 that self-interference occurs (step S612). On the other hand, if it is determined that there is no combination of links that interfere with each other (step S620: NO), the CPU 11 notifies the path search apparatus 20 that self-interference does not occur (step S622).

Note that it is sufficient that the processing in step S600, which is processing for acquiring region information, is executed only when the processing in FIG. 19 is executed for the first time, and thus the processing in step S600 may be omitted from the second time on.

As described above, according to the interference determination apparatus 10 of a first embodiment, the following effects are achieved. The interference determination apparatus 10 sets a self-interference region and a non-self-interference region in a configuration space in which the angles of rotation of specific joints are indicated by coordinate axes, and a region that does not belong to the self-interference region or the non-self-interference region is defined as a detail determination region. Subsequently, whether or not self-interference occurs is determined by determining whether or not combinations of joint values of the specific joints is in the self-interference region. Thus, compared with a case where a three-dimensional model that is based on the shapes of the links is generated and whether or not self-interference occurs is determined as conventional, it is possible to shorten the time required for determining self-interference.

In addition, the self-interference region and the non-self-interference region are simplified, and thus it is possible to further shorten the time required for determining whether or not self-interference occurs.

The interference determination apparatus 10 is not limited to the above embodiments, and various modifications can be made. For example, in the flowchart in FIG. 5, determination regarding self-interference may be performed without taking the links connected to the joints J5 and J6 into consideration. In this case, "the joints J1 and J4 to J6" in the steps in the flowchart in FIG. 5 can be replaced with "the joints J1 and J4". In this case, the self-interference region becomes smaller and the detail determination region becomes larger due to the links connected to the joints J5 and J6 not being taken into consideration, but it is possible to shorten the time required for calculating region information.

In addition, in one or more embodiments, a self-interference region and a non-self-interference region are set in a two-dimensional configuration space in which the angles of rotation of two specific joints are indicated by coordinate axes, but a self-interference region and a non-self-interference region may be set in a three dimensional configuration space in which the angles of rotation of three specific joints are indicated by coordinate axes. In this case, "the joints J2 and J3" in the steps in the flowchart shown in FIG. 4 can be replaced with "the joints J1 to J3", and "the joints J4 and J5" can be replaced with "the joints J4 to J6". Also, "the joints J2 and J3" in the steps in the flowchart shown in FIG. 5 can be replaced with "the joints J1 to J3", and "the joints J1 and J4 to J6" can be replaced with "the joints J4 to J6". Also, "the joints J2 and J3" in the steps in the flowchart shown in FIG. 6 can be replaced with "the joints J1 to J3". In this case, the processes in steps S304 and S310 are omitted. Also, "the joints J4 and J5" in the steps in the flowcharts shown in FIGS. 7 and 8 can be replaced with "the joints J4 to J6". In this case, the processes in steps S402 and S408 in FIG. 7 and the processes in steps S502 and S508 in FIG. 8 are omitted. Also, "the joints J2 and J3" in the steps in the flowchart shown in FIG. 19 can be replaced with "the joints J1 to J3", and "the joints J4 and J5" can be replaced with "the joints J4 to J6".

Figure 20:
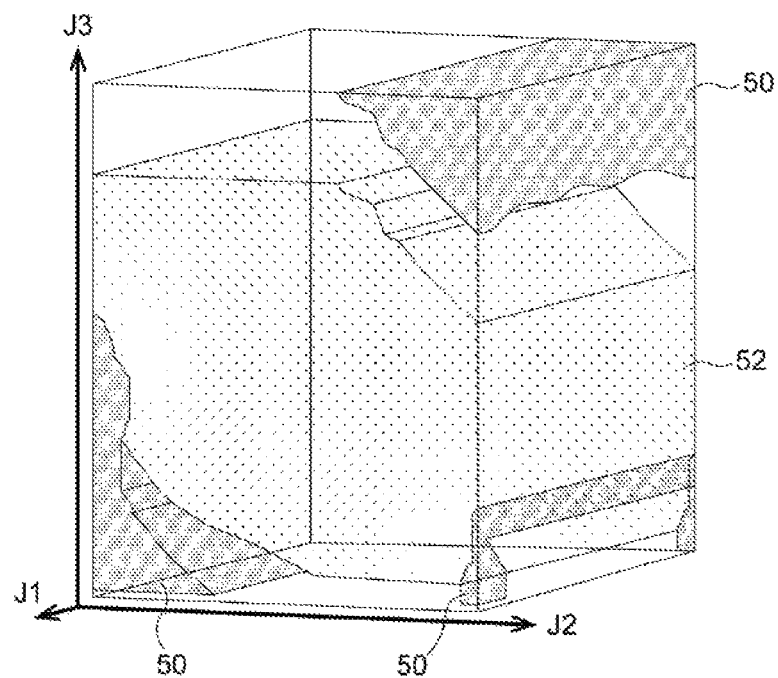
FIG. 20 is a diagram illustrating an example of self-interference regions and a non-self-interference region of joints on a base side in a three-dimensional configuration space.
Figure 21:
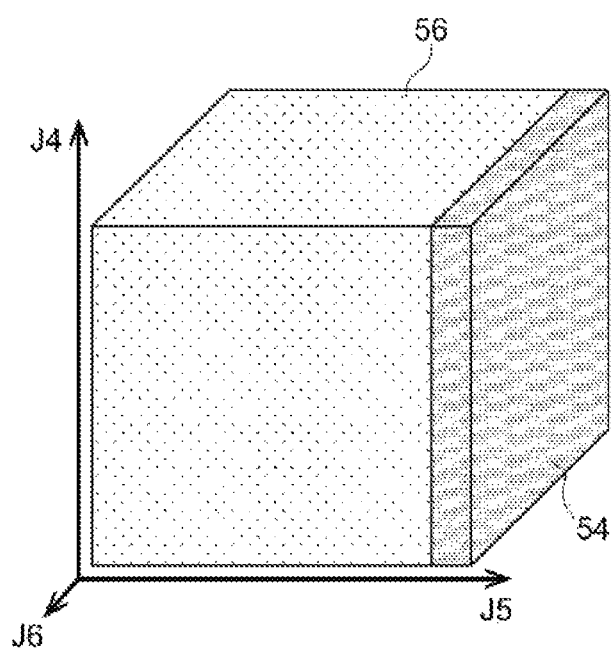
FIG. 21 is a diagram illustrating an example of a self-interference region and a non-self-interference region of joints on a tip end side in a three-dimensional configuration space.

FIG. 20 shows a self-interference region 50 and a non-self-interference region 52 that are set in a three-dimensional configuration space in which the angles of rotation of the joints J1 to J3 are indicated by coordinate axes. In addition, FIG. 21 shows a self-interference region 54 and a non-self-interference region 56 that are set in a three-dimensional configuration space in which the angles of rotation of the joints J4 to J6 are indicated as coordinate axes.

In this manner, if a self-interference region and a non-self-interference region are set in a three-dimensional configuration space, the time required for interference determination becomes longer compared with a case where a self-interference region and a non-self-interference region are set in a two-dimensional configuration space, but it is possible to accurately perform determination regarding self-interference.

In addition, in one or more embodiments, a case has been described in which the vertically articulated robot LB is a six-axis robot that has six joints, but one or more embodiments may be applied to the vertically articulated robot LB that is an articulated robot with five or fewer or seven or more joints.

Second Embodiment

In a first embodiment, a case has been described in which whether or not the vertically articulated robot LB interferes with itself is determined, but, in a second embodiment, a case will be described in which it is determined whether or not obstacle interference occurs, in other words, whether a vertically articulated robot LB interferes with an obstacle.

Note that the same reference numerals are assigned to the same portions as a first embodiment, and a detailed description thereof is omitted.

The hardware configuration and the functional configuration of an interference determination apparatus according to a second embodiment are basically same as the interference determination apparatus 10 described in a first embodiment and shown in FIGS. 1 and 3, except that interference is determined with respect to an obstacle.

Figure 22:
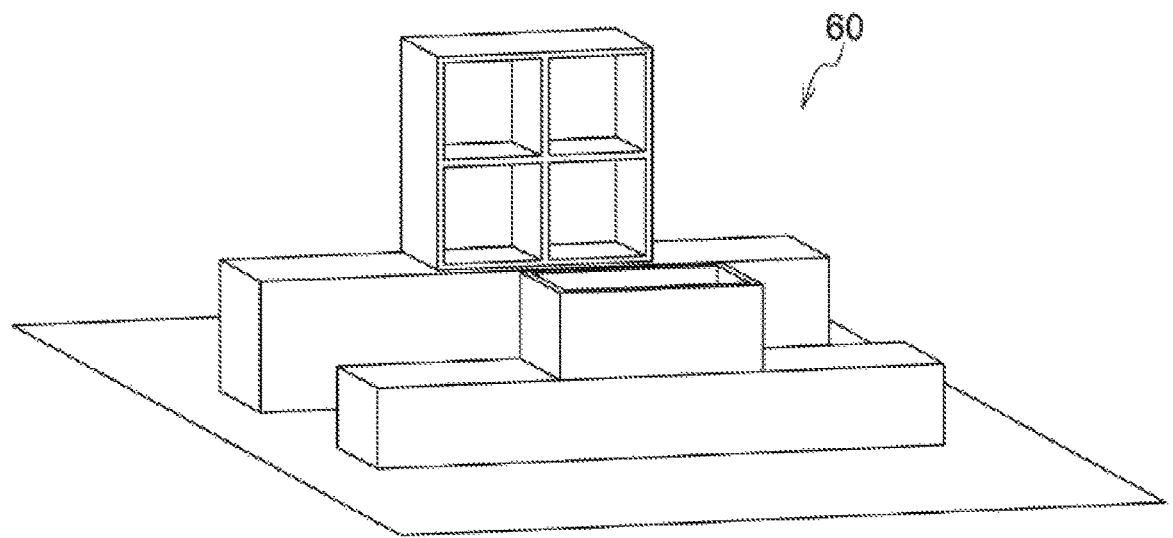
FIG. 22 is a diagram illustrating an example of a three-dimensional model of an obstacle.

A calculation unit 101 in a second embodiment calculates region information indicating an obstacle interference region in which the vertically articulated robot LB interferes with an obstacle and a non-obstacle-interference region in which the vertically articulated robot LB does not interfere with the obstacle, based on the shapes of links L1 to L6 that constitute the vertically articulated robot LB, the movable ranges of joints J1 to J6 that connect the links L1 to L6, and the shape of the obstacle. FIG. 22 shows an obstacle 60 as an example.

An acquisition unit 102 in a second embodiment acquires the region information calculated by the calculation unit 101.

A determination unit 103 in a second embodiment determines whether or not the vertically articulated robot LB interferes with an obstacle, by determining whether coordinates indicating a posture that is determined by the angles of rotation of specific joints belong to the obstacle interference region or the non-obstacle-interference region indicated by the region information acquired by the acquisition unit 102.

A storage unit 104 in a second embodiment stores a region information calculation program and an obstacle interference determination program, which will be described later, the region information calculated by the calculation unit 101, shape data of a base link BL and the links L1 to L6 of the vertically articulated robot LB, information regarding the movable ranges of the joints J1 to J6, shape data of an end effector connected to the joint J6, shape data of a work piece to be processed by the end effector, shape data of an obstacle, and the like.

Next, effects of the interference determination apparatus 10 in a second embodiment will be described.

Similarly to a case where a self-interference region and a non-self-interference region are set in a three-dimensional configuration space in which angles of rotation of three specific joints are indicated by coordinate axes in a first embodiment, region information can be calculated by executing the processes in FIGS. 4 to 8. In this case, in the steps in the flowcharts in FIGS. 4 to 8, the "self-interference region" can be replaced with "obstacle interference region", and the "non-self-interference region" can be replaced with "non-obstacle-interference region". Also, in the steps in the flowcharts in FIGS. 5 to 8, the "self-interference" can be replaced with "obstacle interference", and "non-self-interference" can be replaced with "obstacle non-interference".

In addition, in step S206 in FIG. 5 in a second embodiment, the shape data of the base link BL and the links L1 to L6 and the shape data of the obstacle are acquired from the storage unit 104, and three-dimensional models of the vertically articulated robot LB and the obstacle are generated. Whether or not the vertically articulated robot LB interferes with the obstacle is then determined based on the generated three-dimensional models. Other processing is similar to a first embodiment, and thus a description thereof is omitted.

Figure 23:
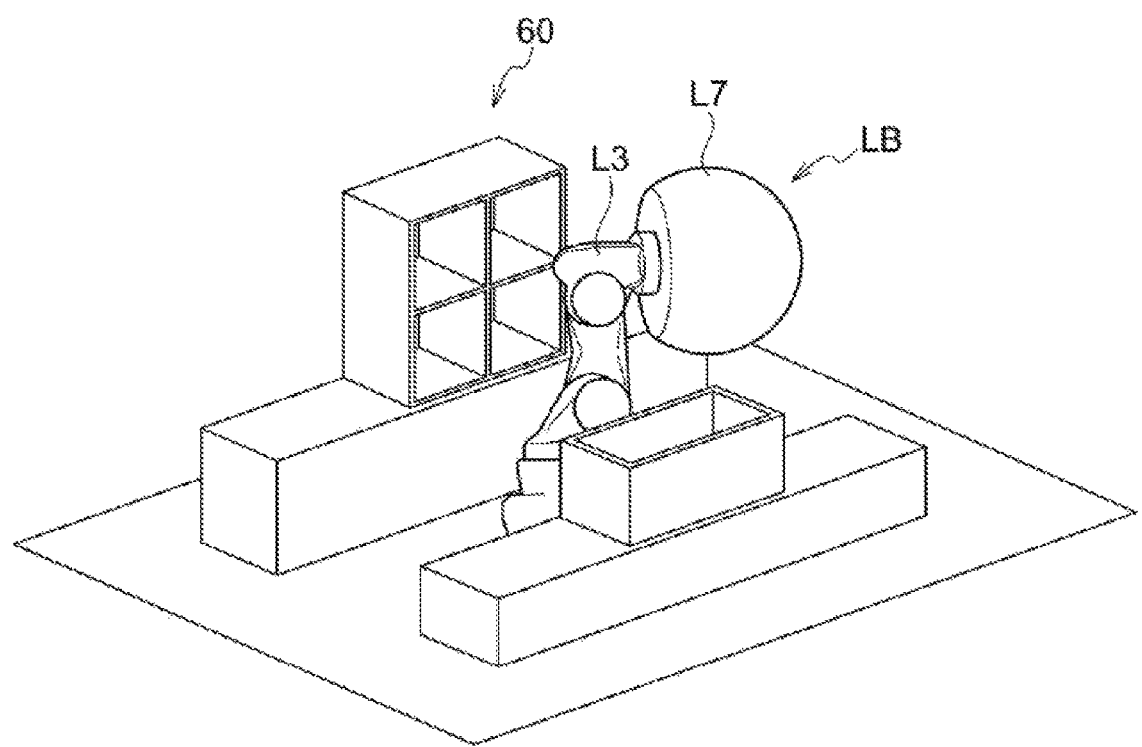
FIG. 23 is a diagram illustrating an example of three-dimensional models of an obstacle and a vertically articulated robot.

In addition, in step S306 in FIG. 6 in a second embodiment, the shape data of the base link BL and the links L1 to L3 and the shape data of the obstacle are acquired from the storage unit 104. Subsequently, a three-dimensional model of the vertically articulated robot LB constituted by the base link BL, the links L1 to L3, and the link L7 is generated based on the acquired shape data of the base link BL and the links L1 to L3 and the shape data of the link L7 calculated in step S300, and a three-dimensional model of the obstacle is generated based on the shape data of the obstacle. FIG. 23 shows the vertically articulated robot LB and the obstacle 60 that are three-dimensional models generated in the process in step S306 as an example. Whether or not the vertically articulated robot LB does not interfere with the obstacle is then determined based on the generated three-dimensional models. Other processing is similar to a first embodiment, and thus a description thereof is omitted.

In addition, in step S404 in FIG. 7 and step S504 in FIG. 8 in a second embodiment, the shape data of the links L4 to L6 and the shape data of the obstacle are acquired from the storage unit 104, and a three-dimensional model in the posture on the tip end of the vertically articulated robot LB is generated, and a three-dimensional model of the obstacle is also generated. Subsequently, whether or not the vertically articulated robot LB interferes with the obstacle is determined based on the generated three-dimensional models. Other processing is similar to a first embodiment, and thus a description thereof is omitted.

In addition, in step S602 in FIG. 18 in a second embodiment, region information indicating an obstacle interference region and a non-obstacle-interference region of the joints J2 and J3 in a configuration space and region information indicating an obstacle interference region and a non-obstacle-interference region of the joints J4 and J5 in the configuration space are acquired from the storage unit 104.

In addition, in step S608 in a second embodiment, the shape data of the base link BL and the links L1 to L3 is acquired from the storage unit 104. Subsequently, a three-dimensional model for the combination of the obstacle and each of the base link BL and the links L1 to L3 is generated, and processing for determining whether or not the vertically articulated robot LB interferes with the obstacle is sequentially executed based on the generated three-dimensional models.

In addition, in step S618 in a second embodiment, the shape data of the links L4 and L5 is acquired from the storage unit 104. Subsequently, a three-dimensional model for the combination of the obstacle and each of the links L4 and L5 is generated, and processing for determining whether or not the vertically articulated robot LB interferes with the obstacle is sequentially executed based on the generated three-dimensional models. Other processing is similar to a first embodiment, and thus a description thereof is omitted.

As described above, in a second embodiment, the interference determination apparatus 10 sets an obstacle interference region and a non-obstacle-interference region in a configuration space in which the angles of rotation of specific joints are indicated by the coordinate axes, and a region that does not belong to the obstacle interference region or the non-obstacle-interference region is defined as a detail determination region. Whether or not obstacle interference occurs is then determined by determining whether or not a combination of joint values of the specific joints is in the obstacle interference region. Thus, compared with a case where a three-dimensional model that is based on the shapes of the links is generated and whether or not obstacle interference occurs is determined, it is possible to shorten the time required for determining whether or not obstacle interference occurs.

Note that interference determination processing that is executed by the CPU reading software (program) in the above embodiments may be executed by any of various types of processors other than the CPU. Examples of the processor in this case include a PLD (programmable logic device) whose circuit configuration can be changed after manufacturing such as an FPGA (field-programmable gate array), a dedicated electric circuit that is a processor having a circuit configuration designed dedicatedly for executing specific processing such as an ASIC (application specific integrated circuit), and the like. In addition, the interference determination processing may be executed by one of these various processors, or may be executed by a combination of two or more processors of the same type or different types (a plurality of FPGAs, a combination of a CPU, an FPGA, etc.). In addition, as more specific hardware structures of these various types of processors, an electric circuit acquired by combining circuit elements such as a semiconductor element is provided.

In addition, in the above embodiments, an aspect has been described in which an interference determination program is stored (installed) in the storage 14 or the ROM 12 in advance, but there is no limitation thereto. The program may be provided in an aspect of being recorded in a recording medium such as a CD-ROM (compact disk read only memory), a DVD-ROM (digital versatile disk read only memory), or a USB (universal serial bus) memory. In addition, an aspect may be adopted in which the program is downloaded from an external apparatus via a network.

LIST OF REFERENCE NUMERALS

10 Interference determination apparatus
14 Storage
15 Input unit
16 Monitor
17 Optical disk driving apparatus
18 Communication interface
19 Bus
20 Path search apparatus
22A to 22C, 30A to 30C, 42, 50, 54 Self-interference region
26, 28, 44, 52, 56 Non-self-interference region
32, 34, 36 Maximum movable range
40 Detail determination region
60 Obstacle
101 Calculation unit
102 Acquisition unit
103 Determination unit
104 Storage unit

The invention claimed is:

1. An interference determination apparatus for an articulated robot, comprising a processor configured with a program to perform operations comprising:

operation as an acquisition unit configured to acquire region information indicating regions that are set in a configuration space in which angles of rotation of two or three specific joints of the articulated robot are indicated by coordinate axes, the regions comprising an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints; and operation as a determination unit configured to determine whether or not the articulated robot interferes with itself or the obstacle by determining whether coordinates indicating a posture that is determined by the angles of rotation of the specific joints belong to the interference region or the non-interference region that are indicated by the region information acquired by the acquisition unit.

2. The interference determination apparatus for an articulated robot according to claim 1, wherein
the region information comprises information indicating a detail determination region as a region that does not belong to the interference region or the non-interference region.

3. The interference determination apparatus for an articulated robot according to claim 2, wherein the processor is configured with the program to perform operations further comprising:

operation as a calculation unit configured to calculate the region information based on shapes of a plurality of links that constitute the articulated robot and movable ranges of a plurality of joints that connect the plurality of links.

4. The interference determination apparatus for an articulated robot according to claim 3, wherein
the processor is configured with the program to perform operations comprising operations such that operation as the calculation unit is configured to simplify a shape of the interference region so as to fit within an outline of the interference region.

5. The interference determination apparatus for an articulated robot according to claim 3, wherein
the processor is configured with the program to perform operations comprising operations such that operation as the calculation unit is configured to simplify a shape of the non-interference region so as to fit within an outline of the non-interference region.

6. The interference determination apparatus for an articulated robot according to claim 3, wherein the processor is configured with the program to perform operations comprising operations such that:

operation as the calculation unit is configured to calculate first region information indicating the interference region and the non-interference region that are set in a configuration space in which angles of rotation of two or three specific joints on a base side of the articulated robot are indicated by coordinate axes and second region information indicating the interference region and the non-interference region that are set in a configuration space in which angles of rotation of two or three specific joints on a tip end side of the articulated robot are indicated by coordinate axes, and operation as the acquisition unit is configured to acquire the first region information and the second region information calculated by the calculation unit, and operation as the determination unit is configured to determine whether or not the articulated robot interferes with itself or an obstacle, by determining whether coordinates indicating a posture that is determined by the angles of rotation of the two or three specific joints on the base side belong to the interference region or the non-interference region that are indicated by the first region information acquired by the acquisition unit, or determine whether or not the articulated robot interferes with itself or an obstacle, by determining whether coordinates indicating a posture that is determined by the angles of rotation of the two or three specific joints on the tip end side belong to the interference region or the non-interference region that are indicated by the second region information acquired by the acquisition unit.

7. The interference determination apparatus for an articulated robot according to claim 6, wherein,
for calculating information that indicates the non-interference region in the first region information, the processor is configured with the program to perform operations comprising operations such that operation as the calculation unit is configured to calculate a maximum movable range based on a shape of a link on the tip end side and a movable range of an joint on the tip end side, and calculates information indicating the non-interference region based on the calculated maximum movable range and shapes of a plurality of links on the base side.

8. The interference determination apparatus for an articulated robot according to claim 3, wherein
the interference comprises obstacle interference, in which the articulated robot interferes with an obstacle, and
the processor is configured with the program to perform operations comprising operations such that operation as the calculation unit is configured to calculate region information indicating an obstacle interference region in which the articulated robot interferes with the obstacle and a non-obstacle-interference region in which the articulated robot does not interfere with the obstacle.

9. The interference determination apparatus for an articulated robot according to claim 2, wherein
in response to the coordinates belonging to the detail determination region, the processor is configured with the program to perform operations comprising operations such that operation as the determination unit is configured to determine whether or not self-interference occurs, based on shapes of a plurality of links that constitute the articulated robot.

10. The interference determination apparatus for an articulated robot according to claim 1, wherein the processor is configured with the program to perform operations further comprising:
operation as a calculation unit configured to calculate the region information based on shapes of a plurality of links that constitute the articulated robot and movable ranges of a plurality of joints that connect the plurality of links.

11. The interference determination apparatus for an articulated robot according to claim 10, wherein
the processor is configured with the program to perform operations comprising operations such that operation as the calculation unit is configured to simplify a shape of the interference region so as to fit within an outline of the interference region.

12. The interference determination apparatus for an articulated robot according to claim 10, wherein
the processor is configured with the program to perform operations comprising operations such that operation as the calculation unit is configured to simplify a shape of the non-interference region so as to fit within an outline of the non-interference region.

13. The interference determination apparatus for an articulated robot according to claim 10, wherein the processor is configured with the program to perform operations comprising operations such that:
operation as the calculation unit is configured to calculate first region information indicating the interference region and the non-interference region that are set in a configuration space in which angles of rotation of two or three specific joints on a base side of the articulated robot are indicated by coordinate axes and second region information indicating the interference region and the non-interference region that are set in a configuration space in which angles of rotation of two or three specific joints on a tip end side of the articulated robot are indicated by coordinate axes, and
operation as the acquisition unit is configured to acquire the first region information and the second region information calculated by the calculation unit, and
operation as the determination unit is configured to determine whether or not the articulated robot interferes with itself or an obstacle, by determining whether coordinates indicating a posture that is determined by the angles of rotation of the two or three specific joints on the base side belong to the interference region or the non-interference region that are indicated by the first region information acquired by the acquisition unit, or determine whether or not the articulated robot interferes with itself or an obstacle, by determining whether coordinates indicating a posture that is determined by the angles of rotation of the two or three specific joints on the tip end side belong to the interference region or the non-interference region that are indicated by the second region information acquired by the acquisition unit.

14. The interference determination apparatus for an articulated robot according to claim 13, wherein,
for calculating information that indicates the non-interference region in the first region information, the processor is configured with the program to perform operations comprising operations such that operation as the calculation unit is configured to calculate a maximum movable range based on a shape of a link on the tip end side and a movable range of an joint on the tip end side, and calculates information indicating the non-interference region based on the calculated maximum movable range and shapes of a plurality of links on the base side.

15. The interference determination apparatus for an articulated robot according to claim 10, wherein
the interference comprises obstacle interference, in which the articulated robot interferes with an obstacle, and
the processor is configured with the program to perform operations comprising operations such that operation as the calculation unit is configured to calculate region information indicating an obstacle interference region in which the articulated robot interferes with the obstacle and a non-obstacle-interference region in which the articulated robot does not interfere with the obstacle.

16. An interference determination method for an articulated robot for a computer to execute processing comprising:
acquiring region information indicating regions that are set in a configuration space in which angles of rotation of two or three specific joints of the articulated robot are indicated by coordinate axes, the regions comprising an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints; and
determining whether or not the articulated robot interferes with itself or the obstacle by determining whether coordinates indicating a posture that is determined by the angles of rotation of the specific joints belong to the interference region or the non-interference region that are indicated by the acquired region information.

17. A non-transitory computer-readable storage medium storing an interference determination program for an articulated robot, the program, which when read and executed, causes a computer to perform operations comprising:

operation as an acquisition unit configured to acquire region information indicating regions that are set in a configuration space in which angles of rotation of two or three specific joints of the articulated robot are indicated by coordinate axes, the regions comprising an interference region in which the articulated robot interferes with itself or an obstacle, and that is determined based on magnitudes of the angles of rotation of the specific joints and a non-interference region in which the articulated robot does not interfere with itself or an obstacle, and that is determined based on the magnitudes of the angles of rotation of the specific joints; and operation as a determination unit configured to determine whether or not the articulated robot interferes with itself or the obstacle by determining whether coordinates indicating a posture that is determined by the angles of rotation of the specific joints belong to the interference region or the non-interference region that are indicated by the region information acquired by the acquisition unit.

18. A path planning apparatus comprising:
a path search apparatus that performs path planning by searching for postures in which an articulated robot does not interfere itself or an obstacle in a case in which the articulated robot is operated from an initial posture to a target posture, and
the interference determination apparatus according to claim 1, configured to determine whether or not the articulated robot in a posture retrieved by the path search apparatus interferes with itself or an obstacle.

* * * * *